(12) United States Patent
Kim et al.

(10) Patent No.: US 9,392,589 B2
(45) Date of Patent: Jul. 12, 2016

(54) METHOD AND APPARATUS FOR TRANSMITTING UPLINK CONTROL CHANNELS AND UPLINK DATA CHANNELS IN COMP SYSTEM

(71) Applicant: Samsung Electronics Co., Ltd., Gyeonggi-do (KR)

(72) Inventors: Young Bum Kim, Seoul (KR); Joon Young Cho, Gyeonggi-do (KR); Youn Sun Kim, Gyeonggi-do (KR); Ki-Il Kim, Gyeonggi-do (KR); Ju Ho Lee, Gyeonggi-do (KR); Hyo Jin Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/375,774

(22) PCT Filed: Jan. 30, 2013

(86) PCT No.: PCT/KR2013/000728
§ 371 (c)(1),
(2) Date: Jul. 30, 2014

(87) PCT Pub. No.: WO2013/115550
PCT Pub. Date: Aug. 8, 2013

(65) Prior Publication Data
US 2015/0049622 A1 Feb. 19, 2015

(30) Foreign Application Priority Data
Jan. 30, 2012 (KR) .................. 10-2012-0008814

(51) Int. Cl.
*H04L 12/26* (2006.01)
*H04W 72/04* (2009.01)
(Continued)

(52) U.S. Cl.
CPC ....... *H04W 72/0413* (2013.01); *H04J 11/0053* (2013.01); *H04L 5/0035* (2013.01);
(Continued)

(58) Field of Classification Search
None
See application file for complete search history.

(56) References Cited

U.S. PATENT DOCUMENTS

2010/0039953 A1   2/2010  Zhang
2010/0067472 A1   3/2010  Ball et al.
(Continued)

FOREIGN PATENT DOCUMENTS

| KR | 10-2011-0010683 | 2/2011 |
|---|---|---|
| WO | WO 2011/071291 A2 | 6/2011 |

OTHER PUBLICATIONS

International Search Report dated May 15, 2013 in connection with International Patent Application No. PCT/KR2013/000728, 5 pages.
Written Opinion of International Searching Authority dated May 15, 2013 in connection with International Patent Application No. PCT/KR2013/000728, 4 pages.

*Primary Examiner* — Edan Orgad
*Assistant Examiner* — Rebecca Song

(57) ABSTRACT

The present invention relates to a method for transmitting an uplink channel in a wireless communication system. The method for transmitting an uplink channel of a terminal according to one embodiment of the present invention may comprise the steps of: receiving a downlink control message; extracting the starting point of a dynamic physical uplink control channel (PUCCH) resource region from the downlink control message; and transmitting an uplink channel according to the starting point of the extracted dynamic PUCCH resource region. An embodiment of the invention exhibits effects in reducing the signaling overhead, and preventing the terminal from unnecessarily consuming power, when transmitting the uplink channel in a CoMP system.

20 Claims, 14 Drawing Sheets

(51) Int. Cl.
*H04J 11/00* (2006.01)
*H04L 5/00* (2006.01)
*H04W 24/08* (2009.01)
*H04W 52/24* (2009.01)
*H04W 72/08* (2009.01)
*H04W 72/12* (2009.01)
*H04W 52/14* (2009.01)

(52) U.S. Cl.
CPC ............ *H04L5/0051* (2013.01); *H04L 5/0053* (2013.01); *H04W 24/08* (2013.01); *H04W 52/146* (2013.01); *H04W 52/241* (2013.01); *H04W 52/242* (2013.01); *H04W 72/085* (2013.01); *H04W 72/1289* (2013.01)

(56) References Cited

U.S. PATENT DOCUMENTS

| | | | |
|---|---|---|---|
| 2011/0235602 A1 | 9/2011 | Ji et al. | |
| 2012/0002631 A1* | 1/2012 | Nishio et al. | 370/329 |
| 2012/0069815 A1* | 3/2012 | Aiba | H04L 5/001 |
| | | | 370/329 |
| 2012/0106490 A1* | 5/2012 | Nakashima et al. | 370/329 |
| 2014/0105042 A1* | 4/2014 | Cui et al. | 370/252 |
| 2014/0355529 A1* | 12/2014 | Zhu | H04N 21/2365 |
| | | | 370/329 |

* cited by examiner

METHOD AND APPARATUS FOR TRANSMITTING UPLINK CONTROL CHANNELS AND UPLINK DATA CHANNELS IN COMP SYSTEM

CROSS-REFERENCE TO RELATED APPLICATION(S)

The present application claims priority under 35 U.S.C. §365 to International Patent Application No. PCT/KR2013/000728 filed Jan. 30, 2013, entitled "METHOD AND APPARATUS FOR TRANSMITTING UPLINK CONTROL CHANNELS AND UPLINK DATA CHANNELS IN CoMP SYSTEM". International Patent Application No. PCT/KR2013/000728 claims priority under 35 U.S.C, §365 and/or 35 U.S.C §119(a) to Korean Patent Application No. 10-2012-0008814 filed Jan. 30, 2012, and which are incorporated herein by reference into the present disclosure as if fully set forth herein.

TECHNICAL FIELD

The present invention relates to a method of transmitting an uplink channel in a wireless communication system, and particularly, to a method and apparatus for transmitting an uplink channel of a terminal in a mobile communication system to which the Coordinated Multi-Point technology is applied.

BACKGROUND ART

From the early stage of providing voice-oriented services, a mobile communication system has evolved into a high-speed, high-quality wireless packet data communication system to provide data and multimedia services. Various mobile communication standards, such as High Speed Downlink Packet Access (HSDPA) and High Speed Uplink Packet Access (HSUPA), Long Term Evolution (LTE), Long Term Evolution-Advanced (LTE-A), High Rate Packet Data (HRPD) of the $3^{rd}$ generation partnership project-2 (3GPP2), and IEEE 802.16, have recently been developed to support high-speed and high-quality wireless packet data transmission services. In particular, the LTE system, which is a system developed to efficiently support high speed wireless packet data transmission, maximizes wireless system capacity by using various wireless access technologies. The LTE-A system, which is an advanced wireless system evolved from the LTE system, has enhanced data transmission capability, as compared to the LTE system.

The existing $3^{rd}$ generation wireless packet data communication systems, such as HSDPA, HSUPA and HRPD, use technologies of an Adaptive Modulation and Coding (AMC) scheme and a channel-sensitive scheduling scheme to improve the transmission efficiency. With the use of the AMC scheme, a transmitter may adjust an amount of transmission data according to a channel status. That is, when the channel status is not good, the transmitter may reduce the amount of transmission data to adjust the reception error probability to a desired level. In contrast, when the channel status is good, the transmitter may increase the amount of transmission data to achieve efficient transmission of a large quantity of information while adjusting the reception error probability to a desired level.

With the use of the channel-sensitive scheduling-based resource management method, the transmitter selectively provides a service to a user having a good channel status among a plurality of users, and thus, the system capacity increases as compared to the method of assigning a channel to one user and providing a service to the user with the assigned channel. Such a capacity increase as in the above description is referred to as "multi-user diversity gain". In short, the AMC scheme and the channel-sensitive scheduling scheme are methods that apply an appropriate modulation and coding scheme at a point in time that is determined to be most efficient based on partial channel status information fed back from a receiver.

The AMC scheme, when used together with a Multiple Input Multiple Output (MIMO) transmission scheme, may include a function of determining a rank or the number of spatial layers of a transmission signal. In this instance, to determine an optimal data rate, the AMC scheme may consider the number of layers to which transmission is executed using the MIMO, instead of considering merely a coding rate and a modulation scheme.

In general, the LTE and the LTE-A systems use an Orthogonal Frequency Division Multiple Access (OFDMA) scheme. The OFDMA scheme allocates or manages time-frequency resources through which data or control information is carried for each user, to not overlap one another, that is, to have orthogonality, and thereby distinguishes data or control information of each user. It is known that an increase in a capacity may be expected from the OFDMA scheme as compared to a Code Division Multiple Access (CDMA) scheme that has been used in the existing $2^{nd}$ and $3^{rd}$ generation mobile communication systems. One of the several causes bringing about the capacity increase in the OFDMA scheme is that the OFDMA scheme may perform scheduling in a frequency domain (Frequency Domain Scheduling). Although a capacity gain is acquired according to the time-varying channel characteristic using the channel-sensitive scheduling method, it is possible to obtain a higher capacity gain with use of the frequency-varying channel characteristic. According to the conventional art, a mobile communication system formed of a plurality of cells, provides a mobile communication service utilizing the above described various methods.

FIG. 1 illustrates a configuration of a cellular mobile communication system according to the conventional art. Referring to FIG. 1, in a mobile communication system formed of three cells 100, 110, and 120, a transceiving antenna 130 is disposed in the center of each cell 100, 110 and 120. Each cell executes mutual communication with terminals included in a corresponding cell.

The mobile communication system of FIG. 1 includes the first cell 100, the second cell 110, and the third cell 120. The first cell 100 of the cells includes a central antenna 130 disposed in the center of the first cell 100, a first terminal (User Equipment (UE) or Mobile Station (MS)) 140, and a second terminal 150. The central antenna 130 provides a mobile communication service with respect to the two terminals 140 and 150 located in the first cell 100. A distance from the first terminal 140, which is provided with a mobile communication service through the central antenna 130, to the central antenna 130 is relatively farther than a distance from the second terminal 150 to the central antenna 130. Accordingly, a data transmission speed supported to the first terminal 140 is relatively lower than a data transmission speed supported to the second terminal 150.

The mobile communication system as shown in FIG. 1 transmits a Reference Signal (RS) for measuring a downlink channel status of each cell. The RS is also referred to as a pilot signal. In the case of the LTE-A system of the 3GPP, a terminal measures a channel status between a base station and the terminal by using a Channel Status Information Reference Signal (CSI-RS) transmitted by the base station.

FIG. 2 is a diagram illustrating a location of a CSI-RS that a base station transmits to a terminal in an LTE-A system according to the conventional art.

In FIG. 2, a horizontal axis indicates a time domain and a vertical axis indicates a frequency domain. A minimum transmission unit of the time domain is an OFDMA symbol. A single slot 222 and 223 is formed of $N_{symb}^{DL}$ OFDM symbols. A single subframe 224 is formed of two slots. A minimum transmission unit of the frequency domain is a sub-carrier and an entire system transmission band is formed of a total of $N_{BW}$ sub-carriers. $N_{BW}$ has a value, which is proportional to a system transmission band. A base unit of a resource in time-frequency domains is a Resource Element (RE). The RE is defined by an OFDM symbol index and a sub-carrier index. A Resource Block (RB) 220 and 221 is defined by $N_{symb}^{DL}$ successive OFDM symbols in the time domain and $N_{sc}^{RB}$ successive sub-carriers in the frequency domain. Accordingly, a single RB is formed of $N_{symb}^{DL} \times N_{sc}^{RB}$ REs. In general, a minimum transmission unit of data or control information is an RB unit.

A downlink control channel is transmitted within the first 3 OFDM symbols of a subframe. A Physical Downlink Shared Channel (PDSCH), which is a downlink physical data channel, is transmitted during a subframe section remaining after excluding the section where the downlink control channel is transmitted. A Demodulation Reference Signal (DM-RS) is a reference signal that a terminal refers to for demodulating a PDSCH.

It is designed that a signal associated with two CSI-RS antenna ports is transmitted from each of the locations 200 through 219 of FIG. 2. That is, a base station transmits, to a terminal, a signal associated with two CSI-RS antenna ports for measuring a downlink from a location 200. An antenna port is a logical concept, and a CSI-RS is defined for each antenna port and is operated to measure a channel status of each antenna port. When an identical CSI-RS is transmitted from a plurality of physical antennas, a terminal may not distinguish each physical antenna and may recognize them as a single antenna port.

In general, a CSI-RS and a cell are in a one-to-one correspondence. That is, in the case of the mobile communication system formed of a plurality of cells, as shown in FIG. 1, a CSI-RS is transmitted by allocating a separated location for each cell. For example, a CSI-RS for the first cell 100 of FIG. 1 is transmitted from the location 200 and a CSI-RS for the second cell 110 is transmitted from the location 205. Also, a CSI-RS for the third cell 120 is transmitted from the location 210. As described above, allocation of time and frequency resources for CSI-RS transmission executed in different locations with respect to each cell is to prevent interference between CSI-RSs of different cells. However, in the case of FIG. 1, transceiving antennas of each base station are disposed intensively in the center of a cell and thus it is limited in that a high data transmission rate is not supported to terminals that are disposed far from the center of the cell.

FIG. 3 is a diagram of a system to which a Coordinated Multi-point operation (CoMP) is applied, which is a multiple cell cooperative communication technology. Referring to FIG. 3, a mobile communication system includes three cells 300, 310, and 320. A transceiving antenna 330 is disposed in the center of each cell 300, 310, and 320, and distributed antennas 360, 370, 380, and 390 are disposed in different locations of a cell. The central antenna 330 disposed in the center of each cell 300, 310, and 320 may transmit a signal to a terminal with a relatively high transmission power, and forms a macro cell which has a broad coverage. The distributed antennas 360, 370, 380, and 390, which are located to be distributed in each macro cell 300, 310, and 320, may transmit a signal to a terminal with a relatively low transmission power and thus, may form a small cell having a narrow coverage. Each of the central antenna 330 and the distributed antennas 360, 370, 380, and 390 are formed of a single or a plurality of antennas.

As described above, a set formed of a single or a plurality of antennas, which is disposed in an identical point, is referred to as a point. The point is classified into a Transmission Point (TP) from the perspective of a signal transmission of a base station and a Reception Point (RP) from the perspective of a signal reception of the base station.

Referring to FIG. 3, the first cell 300, the second cell 310, and the third cell 320 correspond to a macro cell. A first-1 cell 302, a first-2 cell 304, a first-3 cell 306, and a first-4 cell 308 form a small cell in the first cell 300. A second-1 cell 312, a second-2 cell 314, and a second-3 cell 316 form a small cell in the second cell 310. A third-1 cell 322, a third-2 cell 324, a third-3 cell 326, and a third-4 cell 328 form a small cell in the third cell 320.

All of the central antenna (or a central point) 330 of the macro cell and the plurality of distributed antennas (or distributed points) 360, 370, 380, and 390, included in the macro cell, are connected together to a central controller, and controlled by the central controller. Hereinafter, a CoMP scheme in which the small cell has a cell ID identical to the macro cell is referred to as a 'first CoMP scheme', and a CoMP scheme in which the small cell has a cell ID different from the macro cell is referred to as a 'second CoMP scheme.'

In FIG. 3, the first cell 300 which is the macro cell includes the central antenna 330 disposed in the center of the first cell 300, a first terminal 340, a second terminal 350, the first distributed antenna 360, the second distributed antenna 370, the third distributed antenna 380, and the fourth distributed antenna 390. The first distributed antenna 360 forms the first-1 cell 302, the second distributed antenna 370 forms the first-2 cell 304, the third distributed antenna 380 forms the first-3 cell 306, and the fourth distributed antenna 390 forms the first-4 cell 308.

The central antenna 330 provides a mobile communication service to all of the terminals located in the first cell 300. However, a distance from the first terminal 340, which is provided with a mobile communication service through the central antenna 330, to the central antenna 330 is relatively farther than a distance from the second terminal 350 to the central antenna 330. Accordingly, a data transmission speed supported to the first terminal 340 through the central antenna 330 is relatively low.

In general, as a transmission path of a transmission signal increases, a signal quality of the signal decreases. Accordingly, a mobile communication service is provided by disposing a plurality of base station distributed-antennas in a cell and selecting an optimal base station distributed-antenna based on a location of a terminal and thus, a data transmission speed may be improved. For example, the first terminal 340 communicates with the fourth distributed antenna 390 which has the best channel environment, and the second terminal 350 communicates with the first distributed antenna 360 having the best channel environment and thus, a data service of a relatively higher speed may be provided.

In this instance, the central antenna 330 takes charge in supporting a mobile communication service that requires a relatively broad coverage, a mobile communication service that requires a relatively robust quality, and a mobility of a terminal in cells.

The operation of a CSI-RS for measuring a channel status in a CoMP system that operates as shown in FIG. 3 will be described with reference to FIG. 2, as follows.

A CoMP system allocates a separate location for each macro cell or each small cell and transmits a CSI-RS so as to distinguish cells, including the macro cell and the small cell. For example, a CSI-RS for the first cell 300 of FIG. 3 is transmitted from the location 200. Also, a CSI-RS for the second cell 310 is transmitted from the location 205. Also, a CSI-RS for the third cell 320 is transmitted from the location 210. Also, in the case of the small cell included in the macro cell 300, a CSI-RS for the first-1 cell 302 is transmitted from the location 202. A CSI-RS for the first-2 cell 304 is transmitted from the location 206. A CSI-RS for the first-3 cell 306 is transmitted from the location 214. A CSI-RS for the first-4 cell 308 is transmitted from the location 216. As described above, allocation of time and frequency resources for CSI-RS transmission executed in different locations with respect to each of the macro cell and the small cells is to prevent interference between CSI-RSs of different cells.

As described above, the CSI-RS is defined for each antenna port of a logical concept. Accordingly, when an identical CSI-RS is transmitted from a plurality of physical antennas, a terminal may not distinguish each physical antenna irrespective of the geographical locations, and may recognize them as a single antenna port.

A Downlink (DL) CoMP scheme for improving a performance of a downlink, which is a wireless connection from a base station to a terminal, may include Joint Transmission (JT), Dynamic Point Selection (DPS), a Coordinated Scheduling/Beamforming (CS/CB) scheme, or a combination thereof. JT refers to a scheme in which a plurality of points simultaneously transmit signals to a terminal using an identical resource. DPS refers to a scheme in which a single Transmission Point (TP) transmits a signal to be transmitted to a terminal, and the TP dynamically varies. CS/CB refers to a scheme in which a single TP transmits a signal to be transmitted to a terminal, and a plurality of points cooperate and perform scheduling and beamforming.

An Uplink (UP) CoMP scheme for improving a performance of an uplink, which is a wireless connection from a terminal to a base station, may include Joint Reception (JR), Dynamic Point Selection (DPS), Coordinated Scheduling/Beamforming (CS/CB), or a combination thereof. JR refers to a scheme in which a signal transmitted from a terminal is received at a plurality of points, at the same time. DPS refers to a scheme in which a signal transmitted by a terminal is received at a single point, and the Reception Point (RP) dynamically varies. CS/CB refers to a scheme in which a single point receives a signal transmitted by a terminal, and a plurality of points cooperate and perform scheduling and beamforming.

DISCLOSURE OF THE INVENTION

Technical Problem

Therefore, the present invention has been made in view of the above-mentioned problems, and an aspect of the present invention is to provide an uplink channel transmission method that reduces a signaling overhead in a CoMP system, and prevents unnecessary power consumption of a terminal.

Solution to Problem

In accordance with an aspect of the present invention, there is provided a method for a terminal to transmit an uplink channel, the method including: receiving a downlink control message; extracting a starting point of a dynamic Physical Uplink Control Channel (PUCCH) resource area, from the downlink control message; and transmitting an uplink channel based on the extracted starting point of the dynamic PUCCH resource area.

In accordance with another aspect of the present invention, there is provided a terminal for transmitting an uplink channel, the terminal including: a receiving unit to receive a downlink control message; a controller to extract a starting point of a dynamic Physical Uplink Control Channel (PUCCH) resource area, from the downlink control message; and a transmitting unit to transmit an uplink channel based on the extracted starting point of the dynamic PUCCH resource area.

In accordance with another aspect of the present invention, there is provided a method of receiving an uplink channel, the method including: determining a target Reception Point (RP) of a terminal; determining a Physical Uplink Control Channel (PUCCH) resource area based on the determined target RP; transmitting a downlink control message including information from which a dynamic PUCCH starting point of the terminal is extracted; and receiving an uplink channel based on the determined PUCCH resource area.

In accordance with another aspect of the present invention, there is provided an uplink channel receiving apparatus, the apparatus including: a controller to determine a target Reception Point (RP) of a terminal, and to determine a Physical Uplink Control Channel (PUCCH) resource area of the terminal based on the determined target RP; a transmitting unit to transmit a downlink control message including information from which a dynamic PUCCH starting point of the terminal is extracted; and a receiving unit to receive an uplink channel based on the determined PUCCH resource area.

Advantageous Effects of Invention

According to an embodiment of the present invention, a signaling overhead is reduced and unnecessary power consumption of a terminal is prevented when an uplink channel is transmitted in a CoMP system.

MODE FOR THE INVENTION

Hereinafter, embodiments of the present invention will be described in detail with reference to the accompanying drawings. In the following description of the present invention, a detailed description of known functions or configurations incorporated herein will be omitted when it may make the subject matter of the present invention rather unclear. The terms which will be described below are terms defined in consideration of the functions in the present disclosure, and may be different according to users, intentions of the users, or customs. Therefore, the definitions of the terms should be determined based on the contents throughout the specification.

Further, the following detailed description of embodiments of the present invention is based on an LTE-A (or Advanced E-UTRA) system as a main subject. However, the subject matter of the present invention is applicable to other communication systems having similar technical backgrounds and channel formation with small variations without largely departing from the scope of the present invention, and the variations may be made by determination of those skilled in the art to which the present invention pertains.

According to an embodiment of the present invention, when a mobile communication system formed of a plurality of points operates a CoMP, which is a multiple-cell cooperative communication technology, a central controller (or base station) distinguishes a radio resource for uplink control channel transmission for each cell and directly/indirectly indicates them to a terminal, and the terminal transmits, based on the information, an uplink control channel.

According to an embodiment of the present invention, when a mobile communication system formed of a plurality of points operates a CoMP, which is a multiple-cell cooperative communication technology, a central controller (or base station) directly/indirectly indicates a target Reception Point (target RP) to a terminal, and the terminal transmits, based on the information, an uplink control channel or an uplink data channel by adjusting the transmission power.

Hereinafter, detailed operations of the present invention will be described with reference to particular embodiments.

First Embodiment

According to a first embodiment of the present invention, a CoMP, which is a multiple-cell cooperative communication technology, is operated in a mobile communication system formed of a plurality of points. A central controller (or base station) distinguishes a radio resource for uplink control channel transmission of each cell, and directly and/or indirectly indicates them to a terminal. Based on the information, the terminal transmits an uplink control channel or an uplink data channel.

Figure 1:
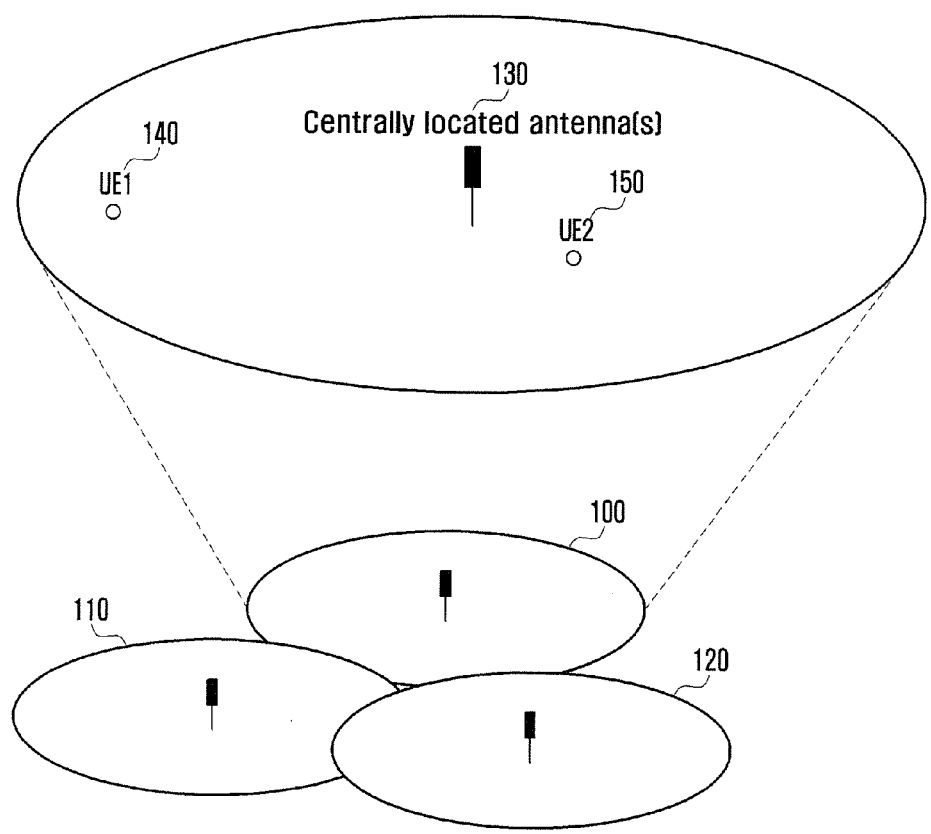
FIG. 1 illustrates a configuration of a cellular mobile communication system according to the conventional art.
Figure 2:
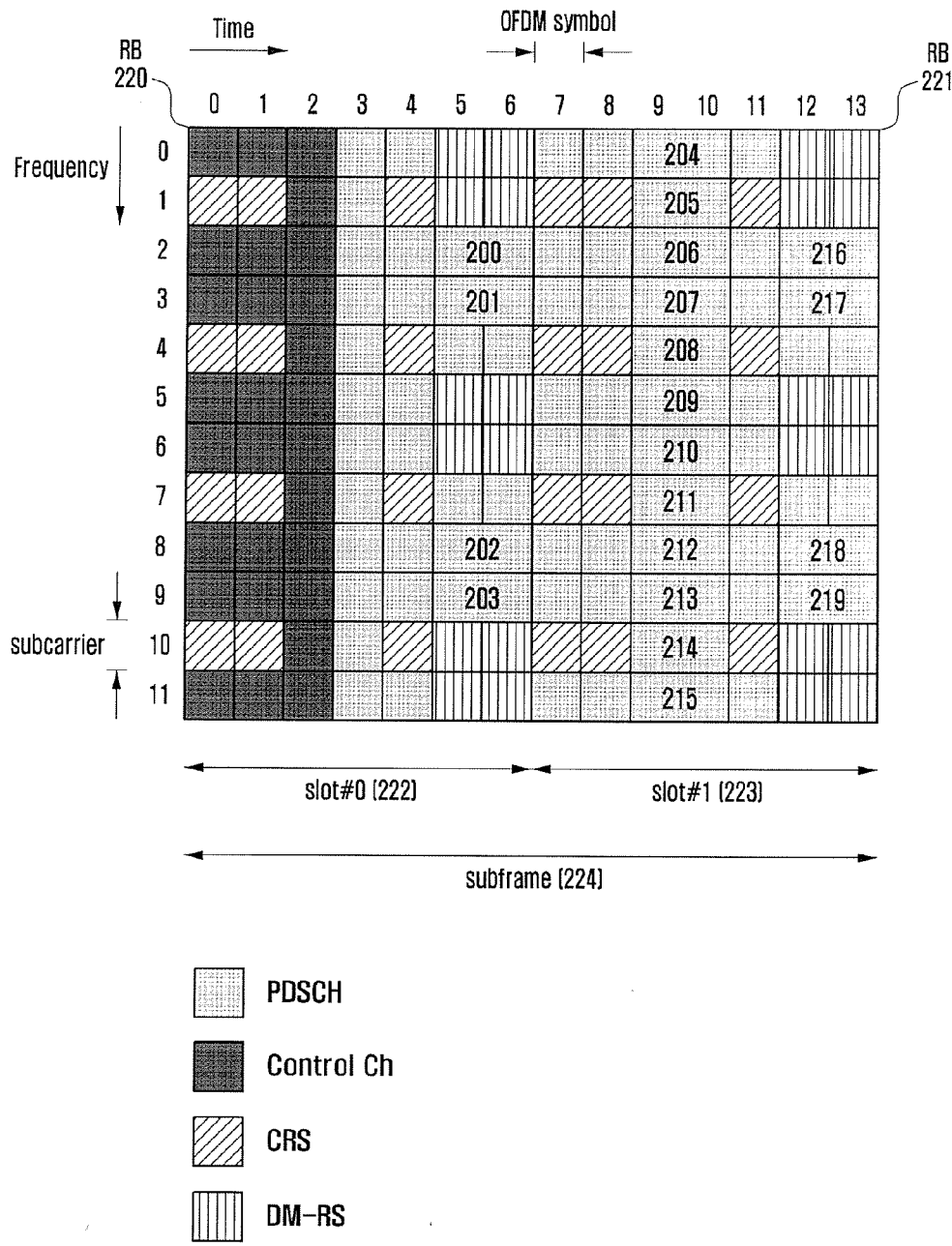
FIG. 2 is a diagram illustrating a location of a Channel Status Information Reference Signal (CSI-RS) that a base station transmits to a terminal in a Long Term Evolution Advanced (LTE-A) system according to the conventional art.
Figure 3:
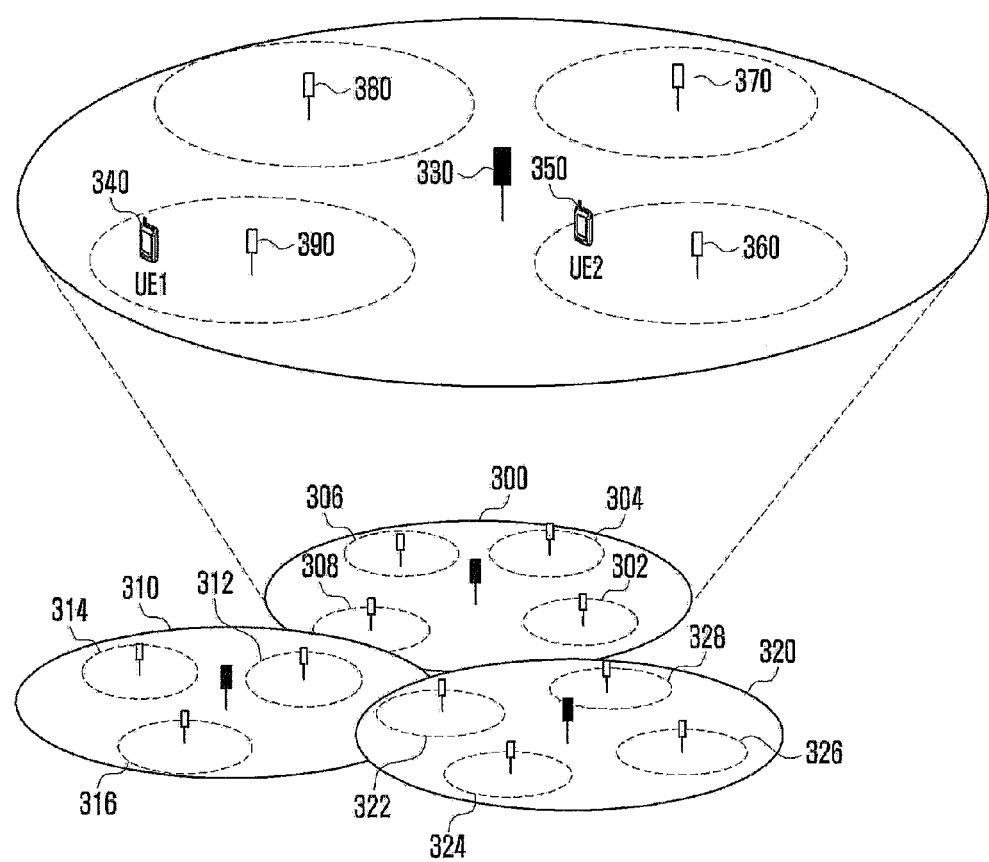
FIG. 3 is a diagram of a system to which a Coordinated Multi-point operation (CoMP) is applied, which is a multiple-cell cooperative communication technology.
Figure 4:
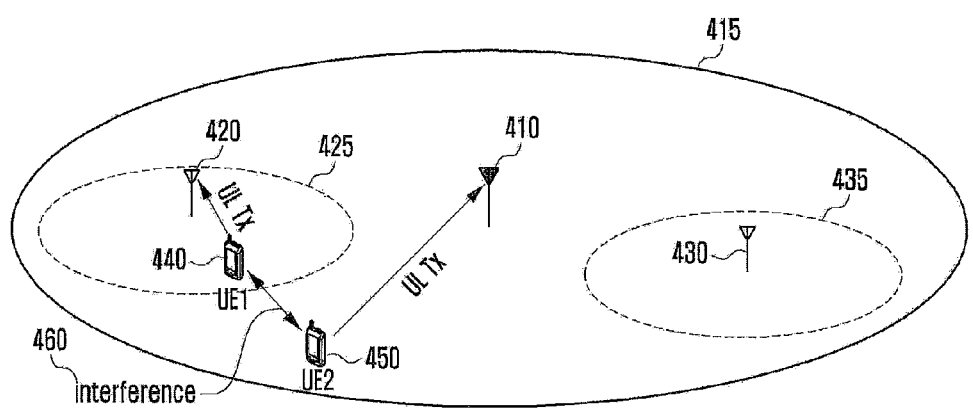
FIG. 4 is a diagram of a CoMP system formed of points 410, 420, and 430.

FIG. 4 is a diagram of a CoMP system formed of points 410, 420, and 430. The point 410 is formed of a single or a plurality of antennas having a high transmission output, and forms a macro cell 415 having a relatively broad coverage. Each of the remaining points 420 and 430 included in the macro cell area is formed of a single or a plurality of antennas having a relatively low transmission output, and each forms a small cell 425 and 435 having a relatively narrow coverage. The points of the CoMP system are connected together and controlled by a central controller (or a base station).

Each point may transmit a distinguishing CSI-RS so that a terminal measures a channel quality of a radio link between each point and the terminal. When an identical CSI-RS is transmitted from a plurality of points, the terminal may not distinguish the points irrespective of the geographical locations, and may recognize them as a single antenna port. In FIG. 4, a second terminal 450 included in the macro cell 415 having a broad coverage, sets a high transmission power of an uplink control channel, so as to successfully transmit the uplink control channel to the point 410 which is relatively farther distant. Conversely, a first terminal 440 included in the small cell 425 having a small coverage sets a relatively low transmission power of an uplink control channel since the first terminal 440 has only to transmit the uplink control channel to the point 420 which is relatively close. When the second terminal 450 included in the macro cell 415 and the first terminal 440 included in the small cell 425 are close, an uplink control channel that the second terminal 450 transmits at a high transmission power may cause interference to transmission of an uplink control channel of the first terminal 440. Conversely, when the first terminal 440 transmits an uplink control channel at a high transmission power, it may cause interference to transmission of an uplink control channel of the second terminal 450.

In LTE and LTE-A systems, an uplink control channel transmits a HARQ-ACK/NACK indicating whether reception of downlink data is successful, CSI information indicating a channel status, or the like, through a Physical Uplink Control Channel (PUCCH). The PUCCH is classified into a dynamic PUCCH of which a PUCCH transmission resource varies and a semi-static PUCCH of which a transmission resource does not dynamically vary. The dynamic PUCCH carries a general HARQ-ACK/NACK, and the semi-static PUCCH carries CSI or a Semi-Persistent Scheduling (SPS) HARQ-ACK/NACK of which transmission resource is defined in advance.

Figure 5:
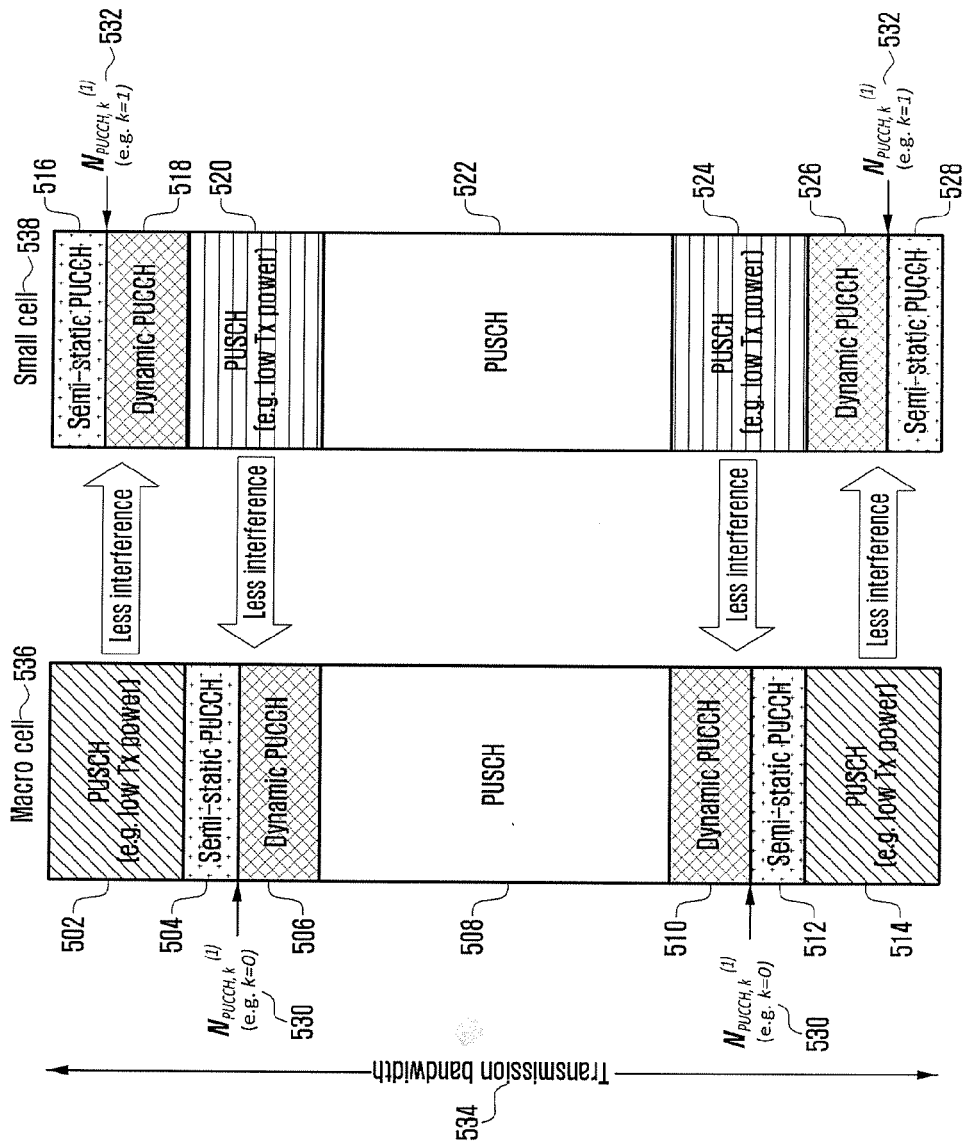
FIG. 5 illustrates a method of disposing resources for PUCCH transmission according to a first embodiment of the present invention.

FIG. 5 illustrates a method of disposing resources for PUCCH transmission according to the first embodiment of the present invention. In LTE and LTE-A systems, a frequency resource for PUCCH transmission is generally located in both ends of an uplink system band 534. A Physical Uplink Shared Channel (PUSCH), which is an uplink data channel, uses frequency resources remaining after excluding frequency resources defined for PUCCH transmission, from among the uplink system transmission band 534.

A frequency disposition 536 of a macro cell will be described. The uplink frequency resources of the macro cell are sequentially disposed from the both ends of the system transmission band 534 in an internal direction, that is, in order of first PUSCH resources 502 and 514 of the macro cell, semi-static PUCCH resources 504 and 512 of the macro cell, dynamic PUCCH resources 506 and 510 of the macro cell, and a second PUSCH resource 508 of the macro cell. The first PUSCH resources 502 and 514 of the macro cell are used as PUSCH resources for terminals located in the center of the macro cell, as far as possible. The second PUSCH resource 508 of the macro cell is used as a PUSCH resource for the remaining terminals.

A frequency disposition 538 of a small cell will be described. The uplink frequency resources of the small cell are sequentially disposed from the both ends of the system transmission band 534 in an internal direction, that is, in order of semi-static PUCCH resources 516 and 528 of the small cell, dynamic PUCCH resources 518 and 526 of the small cell, first PUSCH resources 520 and 524 of the small cell, and a second PUSCH resource 522 of the small cell. The first PUSCH resources 520 and 524 of the small cell are used as PUSCH resources for terminals located to be distant from the center of the macro cell, as far as possible. The second PUSCH resource 522 of the small cell is used as a PUSCH resource for the remaining terminals.

That is, the dynamic PUCCH resources 506 and 510 and the semi-static PUCCH resources 504 and 512, which a terminal of the macro cell uses, may be disposed to not overlap, as far as possible, the dynamic PUCCH resources 518 and 526 and the semi-static PUCCH resources 516 and 528, which a terminal of the small cell uses, in the frequency domain. The uplink resources may be disposed to avoid interference that may be caused to PUCCHs transmitted in corresponding resource areas.

However, the dynamic PUCCH resources 506 and 510 and the semi-static PUCCH resources 504 and 512 that the terminal of the macro cell uses are allowed to overlap the first PUSCH resources 520 and 524 of the small cell which may relatively less frequently cause interference, in the frequency domain. In the case of a PUSCH of a terminal included in the small cell, based on a determination of a base station scheduler, a PUSCH that secures predetermined reception performance with a low transmission power, for example, a PUSCH of a terminal located to be close to a point of the small cell, may be scheduled for the first PUSCH resources 520 and 524 of the small cell. Accordingly, interference that the PUSCH of the terminal included in the small cell causes to the dynamic PUCCH and the semi-static PUCCH of the macro cell terminal may be minimized.

Also, the dynamic PUCCH resources 518 and 526 and the semi-static PUCCH resources 516 and 528 that the terminal of the small cell uses is allowed to overlap the first PUSCH resources 502 and 514 of the macro cell which may relatively less frequently cause interference, in the frequency domain. In the case of a PUSCH of the macro cell, based on a determination of a base station scheduler, a PUSCH that secures a predetermined reception performance with a low transmission power, for example, a PUSCH of a terminal located in the center of the macro cell, may be scheduled for the first PUSCH resources 502 and 514 of the macro cell, and thus, interference caused to the dynamic PUCCH and semi-static PUCCH of the small cell terminal may be minimized.

Also, the first PUSCH resources 502 and 514 of the macro cell are disposed in the edges of the uplink system transmission band 534 and a PUSCH of a low transmission power is scheduled for the first PUSCH resources 502 and 514 and thus, the interference that the PUSCH causes to the outside of the system transmission band may be eased. In the case of a PUCCH of the macro cell, a relatively high transmission power may be needed to secure a broad coverage. Accordingly, when the dynamic PUCCH resources 506 and 510 and the semi-static PUCCH resources 504 and 512 of the macro cell terminal are disposed in the edges of the uplink system transmission band 534, interference may be caused to the outside of the system transmission band due to a high transmission power of the dynamic PUCCH and the semi-static PUCCH.

A central controller (or base station) explicitly sets and operates a PUCCH resource for CSI transmission and a PUCCH resource for SPS HARQ-ACK/NACK transmission with respect to each terminal, in a semi-static PUCCH resource area allocated to the macro cell or the small cell.

Unlike the above, in the case of a HARQ-ACK/NACK to be transmitted by each terminal in a dynamic PUCCH resource area, the central controller (or base station) does not explicitly indicate a PUCCH resource to be used for the transmission. The central controller (or base station) enables each terminal to implicitly determine this through a Physical Downlink Control Channel (PDCCH), which is a downlink control channel that schedules downlink data. When the terminal expresses a PUCCH resource $n_{PUCCH}^{(1)}$ to be used for HARQ-ACK/NACK transmission, it may be expressed as shown in Equation 1.

$$n_{PUCCH}^{(1)} = n_{CCE} + N_{PUCCH}^{(1)} \quad \text{[Equation 1]}$$

Here, $N_{PUCCH}^{(1)}$ is a value indicating a starting point of a dynamic PUCCH resource area or a boundary point of a semi-static PUCCH resource area and a dynamic PUCCH resource area. The central controller (or base station) reports $N_{PUCCH}^{(1)}$ to a terminal. $n_{CCE}$ is the lowest Control Channel Element (CCE) index among CCEs forming a PDCCH.

In a CoMP system, $N_{PUCCH}^{(1)}$ for the macro cell and $N_{PUCCH}^{(1)}$ for the small cell are separately set and thus, the described PUCCH interference that may occur between the macro cell and the small cell may be solved. Accordingly, Equation 1 may be modified to Equation 2 so as to be applied to the CoMP system.

$$n_{PUCCH}^{(1)} = n_{CCE} + N_{PUCCH, k}^{(1)} \quad \text{[Equation 2]}$$

Here, $N_{PUCCH, k}^{(1)}$ is a value indicating a starting point of a dynamic PUCCH resource area with respect to cell k or a boundary point of a semi-static PUCCH resource area and a dynamic PUCCH resource area. The central controller (or base station) reports $N_{PUCCH, k}^{(1)}$ to a terminal, through a signaling. The cell k may be a macro cell or a small cell. Accordingly, the central controller (or base station) sets at least two values as $N_{PUCCH, k}^{(1)}$, and one is used for the macro cell (for example, $N_{PUCCH, 0}^{(1)}$), and the other is used for the small cell (for example, $N_{PUCCH, 1}^{(1)}$). The $N_{PUCCH, k}^{(1)}$ value, which is set for the small cell, is commonly applied to a plurality of small cells forming the CoMP system. Alternatively, a $N_{PUCCH, k}^{(1)}$) value may be set for each small cell forming the CoMP system.

The central controller (or base station) sets the $N_{PUCCH, k}^{(1)}$ values for the macro cell and the small cell, respectively, and report the values to the terminal. Subsequently, when the terminal transmits a HARQ-ACK/NACK through a PUCCH, the central controller (or base station) additionally reports which of the set $N_{PUCCH, k}^{(1)}$ values is to be used for calculating a resource for PUCCH transmission. To report the information, at least one of the following methods will be used.

According to a first method, when the central controller (or base station) transmits downlink data, the central controller (or base station) includes an indicator explicitly indicating a $N_{PUCCH, k}^{(1)}$ value in Downlink Control Information (DCI) which is control information forming a PDCCH that schedules downlink data. For example, when two values, that is, $N_{PUCCH, 0}^{(1)}$ for the macro cell and $N_{PUCCH, 1}^{(1)}$ for the small cell, are used, 1 bit control information may be defined. When the bit is '0', it indicates $N_{PUCCH, 0}^{(1)}$, and when the bit is '1', it indicates $N_{PUCCH, 1}^{(1)}$.

According to a second method, when the central controller (or base station) transmits downlink data, the central controller includes a CSI-RS indicator in the DCI and allows a terminal to determine a $N_{PUCCH, k}^{(1)}$ value from the CSI-RS indicator. The CSI-RS indicator indicates which of the points in a CoMP system is to be used as a reference for adjusting a transmission power of an uplink control channel or an uplink data channel when a terminal transmits an uplink signal. The point used as a reference for adjusting the transmission power of the uplink control channel or uplink data channel, may be referred to as a target Reception Point (target RP). The terminal measures a channel quality of a radio link between a point from which a CSI-RS is transmitted and the terminal, from a CSI-RS indicated by the CSI-RS indicator, and calculates transmission power information for transmitting the uplink control channel or the uplink data channel. The channel quality of the radio link may be expressed through a pathloss. The pathloss is one of the indices indicating a good or bad state of a channel environment, and as the value becomes higher, the pathloss indicates that a channel environment becomes worse. When the pathloss is high, the terminal sets a transmission power of a transmission signal to be high, so as to overcome the bad channel environment. The central controller (or base station) reports a correlation between a CSI-RS and $N_{PUCCH, k}^{(1)}$, in advance through a signaling, so that the terminal determines $N_{PUCCH, k}^{(1)}$ from the CSI-RS indicator.

For example, when the CoMP system operates N CSI-RSs and K $N_{PUCCH, k}^{(1)}$, the central controller (or base station) maps CSI-RS (n) and $N_{PUCCH, k}^{(1)}$ as follows: CSI-RS (0)=>$N_{PUCCH, 0}^{(1)}$, CSI-RS (1)=>$N_{PUCCH, 1}^{(1)}$, CSI-RS (2)=>$N_{PUCCH, 2}^{(1)}$, ..., and reports the same to the terminal in advance through a signaling. When a CSI-RS indicator included in DCI forming a PDCCH that the central controller (or base station) transmits to the terminal, indicates a CSI-RS (0), the terminal measures, from the CSI-RS(0), a channel quality of a radio link between a point from which the CSI-RS(0) is transmitted and the terminal, and calculates transmission power information for transmitting an uplink control channel or an uplink data channel. Also, the terminal recognizes a starting point of a dynamic PUCCH resource area as $N_{PUCCH, 0}^{(1)}$, since the CSI-RS(0) and $N_{PUCCH, 0}^{(1)}$ are in a correspondence relationship, and may extract a PUCCH resource to be used when the terminal transmits a HARQ-ACK/NACK based on Equation 2.

Figure 6:
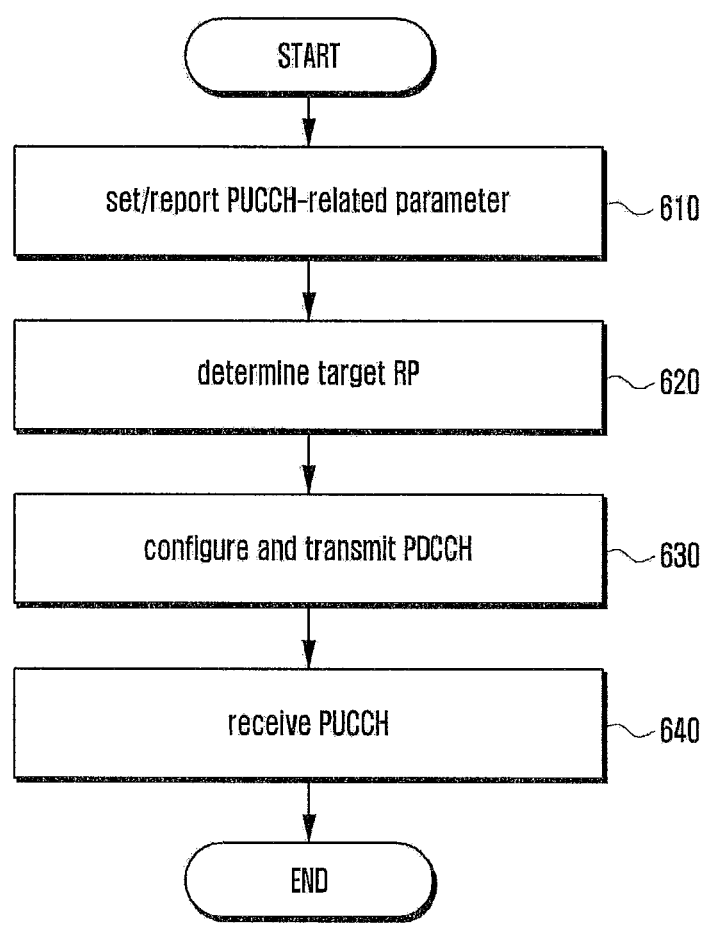
FIG. 6 is a flowchart illustrating an uplink reception process of a central controller (or base station) according to the first embodiment of the present invention.

FIG. 6 is a flowchart illustrating an uplink reception process of a central controller (or base station) according to the first embodiment of the present invention.

In operation 610, the central controller (or base station) sets a PUCCH-related parameter and reports the same to terminals in a CoMP system through a higher layer signaling. The PUCCH-related parameter includes at least one of location information of a dynamic PUCCH resource and a semi-static PUCCH resource of a macro cell and a small cell in a frequency domain, PUCCH resource information for CSI transmission in a semi-static PUCCH resource area, PUCCH resource information for SPS HARQ-ACK/NACK transmission in a semi-static PUCCH resource area, $N_{PUCCH, k}^{(1)}$ information indicating a starting point of a dynamic PUCCH resource area of the macro cell and the small cell, and correlation information between a CSI-RS and $N_{PUCCH, k}^{(1)}$.

In operation 620, the central controller (or base station) determines a target Reception Point (RP) with respect to a predetermined terminal. The central controller (or base station) measures an uplink channel status between the corresponding terminal and various points in the CoMP system, so as to determine a point having a good channel status to be a target RP.

In operation 630, the central controller (or base station) transmits a PDCCH and a PDSCH to the corresponding terminal of operation 620. DCI forming the PDCCH includes an indicator for a $N_{PUCCH, k}^{(1)}$ value which explicitly indicates the $N_{PUCCH, k}^{(1)}$ value to the corresponding terminal (the first method), or may includes an indicator for a CSI-RS associated with the target RP (the second method). The central controller (or base station) may transmit, to the terminal, the indicator associated with the $N_{PUCCH, k}^{(1)}$ value or the indicator indicating the CSI-RS associated with the target RP, through an Enhanced Physical Downlink Control Channel (E-PDCCH), which is an enhanced downlink control channel, instead of the PDCCH.

In operation 640, the central controller (or base station) receives a PUCCH from the corresponding terminal. The central controller (or base station) may receive the PUCCH transmitted from the corresponding terminal, through a PUCCH resource calculated based on the indicator transmitted to the terminal in operation 630.

Figure 7:
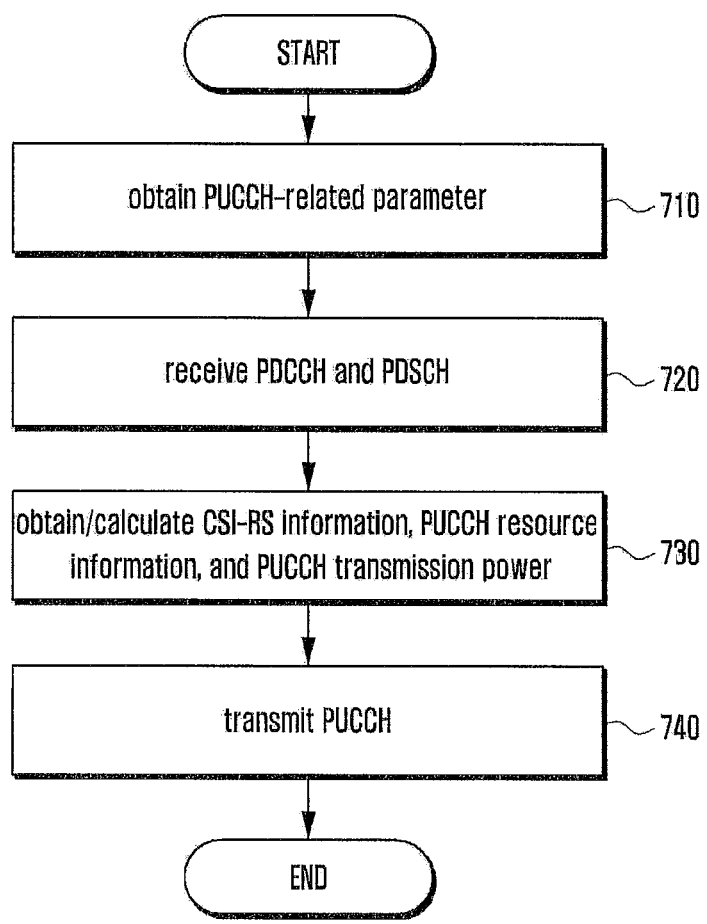
FIG. 7 is a flowchart illustrating an uplink transmission process of a terminal according to the first embodiment of the present invention.

FIG. 7 is a flowchart illustrating an uplink transmission process of a terminal according to the first embodiment of the present invention. The operations of the terminal of FIG. 7 correspond to the operations of the controller (base station) of FIG. 6.

In operation 710, the terminal obtains a PUCCH-related parameter from the central controller (or base station). The PUCCH-related parameter may include information described in operation 610. The terminal may obtain the PUCCH-related parameter through a higher layer signaling.

In operation 720, the terminal receives a PDCCH and a PDSCH from the central controller (or base station). The PDCCH includes scheduling information associated with a PDSCH, and the PDCCH may be replaced with an E-PDCCH.

In operation 730, the terminal obtains an indicator for a $N_{PUCCH, k}^{(1)}$ value from the received PDCCH or E-PDCCH (the first method) or an indicator indicating a CSI-RS associated with a target RP (the second method), determines the $N_{PUCCH, k}^{(1)}$ value, and calculates a PUCCH resource based on Equation 2. Also, a PUCCH transmission power appropriate for the target RP may be calculated from a power control command and target RP information included in the received PDCCH or E-PDCCH.

In operation 740, the terminal transmits a PUCCH based on the PUCCH resource and the PUCCH transmission power calculated in operation 730. The PUCCH includes HARQ-ACK/NACK information associated with the PDSCH received in operation 720.

Various modifications of the first embodiment are available. According to a modification, the central controller (or base station) sets a point-specific parameter set for each point forming a CoMP system, and reports the set point-specific parameter set to a terminal in advance through a higher layer signaling. Also, the central controller (or base station) reports, to the terminal through an additional signaling, target RP information indicating which of the point-specific parameter sets the terminal is to use for transmission of a PUCCH or a PUSCH. The target reception point information is added to DCI forming the PDCCH or the E-PDCCH and may be dynamically operated, or may be operated through a higher layer signaling. When two point-specific parameter sets, that is, a parameter set for a macro cell and a parameter set for a small cell, are operated, the target RP information may be reported through 1 bit. The point-specific parameter set may include at least one of $N_{PUCCH, k}^{(1)}$ information, CSI-RS information, Demodulation Reference Signal (DM-RS) information required for channel estimation associated with a PUSCH, PUCCH sequence information, and RS information required for channel estimation for a PUCCH.

According to another modification of the first embodiment, when the central controller (or base station) schedules a PDSCH through an E-PDCCH, a 'third PUCCH resource' in addition to the dynamic PUCCH resource and semi-static PUCCH resource, may be operated in a macro cell and a small cell, and a HARQ-ACK/NACK corresponding to the PDSCH that is scheduled by the E-PDCCH is transmitted by a terminal in a 'third PUCCH resource' area. In this instance, the PUCCH-related parameter of operation 610 may further include information indicating a starting point of the 'third PUCCH resource' of the macro cell and the small cell, correlation information between a CSI-RS and the starting point of the 'third PUCCH resource' area, and the like so that the terminal determines which of the PUCCH resources is to be used by the terminal for transmitting a PUCCH in the 'third PUCCH resource' area.

Second Embodiment

According to the second embodiment of the present invention, when a mobile communication system formed of a plurality of points operates a CoMP, which is a multiple-cell cooperative communication technology, the central controller (or base station) directly/indirectly indicates a target RP to a terminal, and the terminal transmits a PUCCH or a PUSCH by adjusting the transmission power based on the information. According to the second embodiment, a target RP associated with a PUCCH and a target RP associated with a PUSCH are independently operated.

Figure 8:
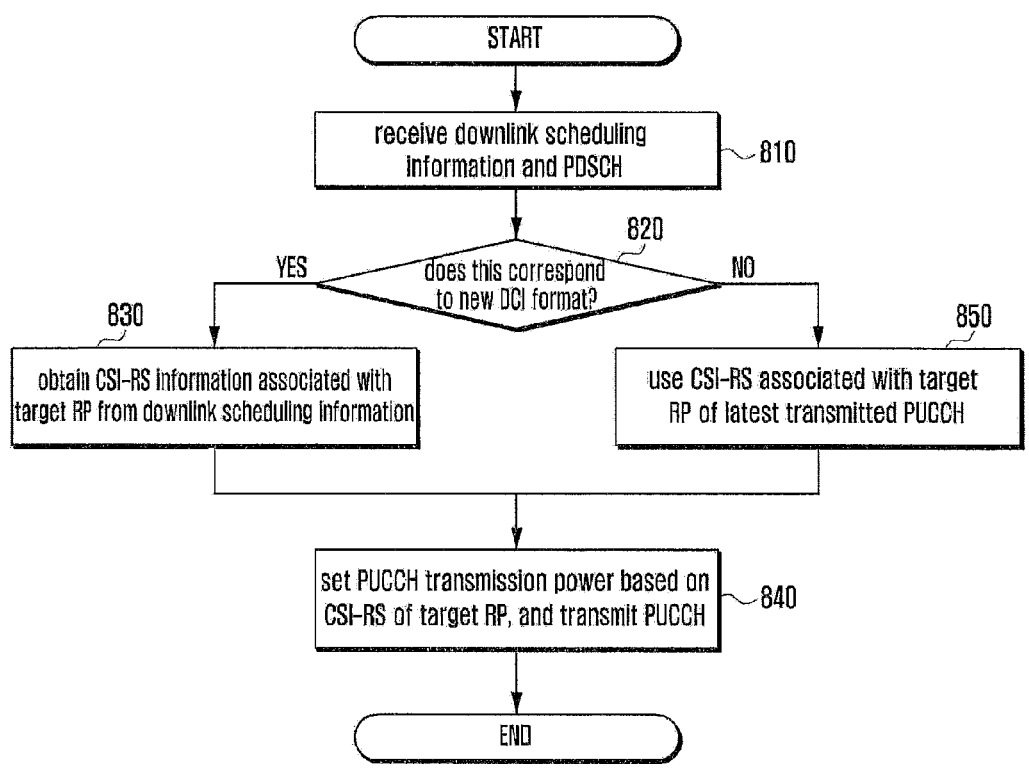
FIG. 8 is a flowchart illustrating a PUCCH transmission process of a terminal according to a second embodiment of the present invention.

FIG. 8 is a flowchart illustrating a PUCCH transmission process of a terminal according to the second embodiment of the present invention.

In operation 810, the terminal receives a PDCCH and a PDSCH from a central controller (or base station). The PDCCH includes downlink scheduling information (Downlink grant (DL grant)) associated with a PDSCH. The terminal may receive downlink scheduling information associated with the PDSCH through an E-PDCCH which is an enhanced downlink control channel, instead of the PDCCH.

In operation 820, the terminal determines whether the received downlink scheduling information corresponds to a new DCI format including a target RP indicator or a CSI-RS indicator or a DCI format defined in the existing LTE and LTE-A systems. The new DCI format includes a target reception point indicator or a CSI-RS indicator for CoMP operation. Conversely, the existing DCI format does not include a target RP indicator or a CSI-RS indicator for CoMP operation. In the LTE and LTE-A systems, the existing DCI format for downlink scheduling may include DCI format 1, DCI format1A, DCI format 1B, DCI format 10, DCI format 1D, DCI format 2, DCI format 2A, DCI format 2B, DCI format 2C, and the like. The new DCI format for downlink scheduling may additionally include a target RP indicator or a CSI-RS indicator in the existing DCI format of each system. Alternatively, the new DCI format for downlink scheduling may be a format that replaces a few fields of the existing DCI format with a field for a target reception point indicator or a CSI-RS indicator.

When the determination of operation 820 shows that the received downlink scheduling information is the new DCI format including the target RP indicator or the CSI-RS indicator, the terminal obtains CSI-RS information associated with a target RP from downlink scheduling information of the new DCI format, in operation 830. The CSI-RS information associated with the target RP may be obtained from the target RP indicator included in the corresponding DCI format or from the CSI-RS indicator included in the corresponding DCI format.

In operation 840, the terminal sets a PUCCH transmission power appropriate for the target RP based on the CSI-RS information associated with the target RP obtained in operation 830, and transmits a PUCCH. The terminal measures a channel quality of a radio link between a point from which a CSI-RS is transmitted and the terminal, from the CSI-RS information associated with the target reception point, and calculates transmission power information for transmitting the PUCCH. The channel quality of the radio link may be expressed through a pathloss. The pathloss is one of the indices indicating a good or bad state of a channel environment, and as the value becomes higher, the pathloss indicates that the channel environment becomes worse. When the pathloss is high, the terminal sets a transmission power of a transmission signal to be relatively high, so as to overcome the bad channel environment. The PUCCH includes HARQ-ACK/NACK information associated with the PDSCH that the terminal receives in operation 810.

When the determination of operation 820 shows that the received downlink scheduling information does not correspond to the new DCI format including a target RP indicator or a CSI-RS indicator, the terminal assumes a CSI-RS associated with a target RP of the latest transmitted PUCCH to be a CSI-RS to be used for calculating a transmission power of a PUCCH to be currently transmitted in operation 850. In operation 840, the terminal sets a PUCCH transmission power appropriate for the target RP based on the assumed CSI-RS, and transmits a PUCCH. The PUCCH includes HARQ-ACK/NACK information associated with the PDSCH that the terminal receives in operation 810.

According to a modification of operation 850, when the determination of 820 shows that the received downlink scheduling information does not correspond to the new DCI format, the terminal may assume a CSI-RS associated with a point, which is defined in advance and reported by the central controller (or base station) through a signaling, to be a CSI-RS to be used for calculating a transmission power of a PUCCH to be currently transmitted.

When the terminal receives an existing DCI format, the terminal may set $N_{PUCCH, k}^{(1)}$ of the latest transmitted PUCCH to be $N_{PUCCH, k}^{(1)}$ of a PUCCH to be currently transmitted, in connection with the first embodiment, in operation 850.

Figure 9:
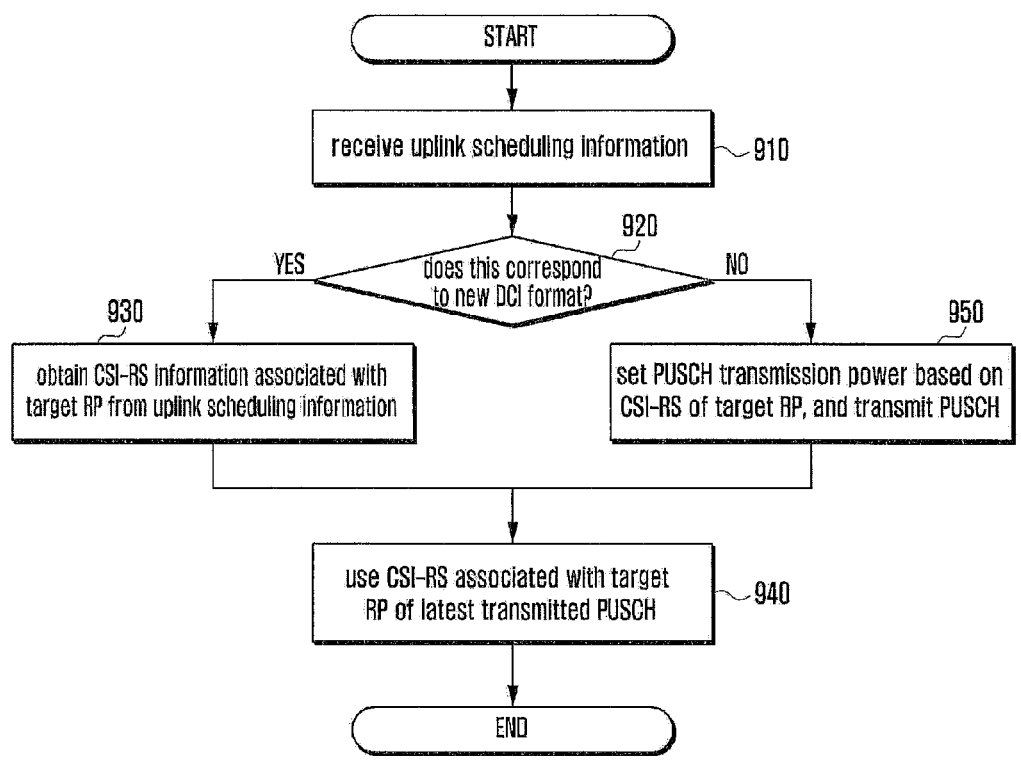
FIG. 9 is a flowchart illustrating a PUSCH transmission process of a terminal according to the second embodiment of the present invention.

FIG. 9 is a flowchart illustrating a PUSCH transmission process of a terminal according to the second embodiment of the present invention.

In operation 910, the terminal receives a PDCCH from a central controller (or base station). The PDCCH includes uplink scheduling information (Uplink grant (UL grant)) associated with a PUSCH to be transmitted by the terminal. The terminal may receive uplink scheduling information associated with the PUSCH through an E-PDCCH which is an enhanced downlink control channel, instead of the PDCCH.

In operation 920, the terminal determines whether the received uplink scheduling information corresponds to a new DCI format including a target RP indicator or a CSI-RS indicator, or a DCI format defined in the existing LTE and LTE-A systems. The new DCI format includes a target RP indicator or a CSI-RS indicator for CoMP operation. Conversely, the existing DCI format does not include a target RP indicator or a CSI-RS indicator for CoMP operation. In the LTE and LTE-A systems, the existing DCI format for uplink scheduling includes DCI format 0, DCI format 4, and the like. The new DCI format for uplink scheduling may additionally include a target RP indicator or a CSI-RS indicator in the existing DCI format of each system. Alternatively, the new DCI format for uplink scheduling may be a format that replaces a few fields of the existing DCI format with a field for a target RP indicator or a CSI-RS indicator.

When the determination of operation 920 shows that the received uplink scheduling information is the new DCI format including the target RP indicator or the CSI-RS indicator, the terminal obtains CSI-RS information associated with a target RP from the uplink scheduling information of the new DCI format, in operation 930. The terminal may obtain the CSI-RS information associated with the target RP from the target RP indicator included in the new DCI format or from the CSI-RS indicator included in the new DCI format.

In operation 940, the terminal sets a PUSCH transmission power appropriate for the target RP based on the CSI-RS information associated with the target RP obtained in operation 930, and transmits a PUSCH. The terminal measures a channel quality of a radio link between a point from which a CSI-RS is transmitted and the terminal, from the CSI-RS information associated with the target RP, and calculates transmission power information for transmitting the PUSCH. The channel quality of the radio link may be expressed through a pathloss. The pathloss is one of the indices indicating a good or bad state of a channel environment, and as the value becomes higher, the pathloss indicates that the channel environment becomes worse. When the pathloss is high, the terminal sets a transmission power of a transmission signal to be relatively high, so as to overcome the bad channel environment.

When the determination of operation 920 shows that the received uplink scheduling information does not correspond to the new DCI format including a target RP indicator or a CSI-RS indicator, the terminal assumes a CSI-RS associated with a target RP of the latest transmitted PUSCH to be a CSI-RS to be used for calculating a transmission power of a PUSCH to be currently transmitted, in operation 950. In operation 940, the terminal sets a PUSCH transmission power appropriate for the target RP based on the CSI-RS assumed in operation 950, and transmits a PUSCH.

According to a modification of operation 950, when the determination of operation 920 shows that the received uplink scheduling information does not correspond to the new DCI format including a target RP indicator or a CSI-RS indicator, the terminal may assume a CSI-RS associated with a point that is defined in advance and reported by the central controller (or base station) through a signaling, to be a CSI-RS to be used for calculating a transmission power of a PUSCH to be currently transmitted.

Figure 10:
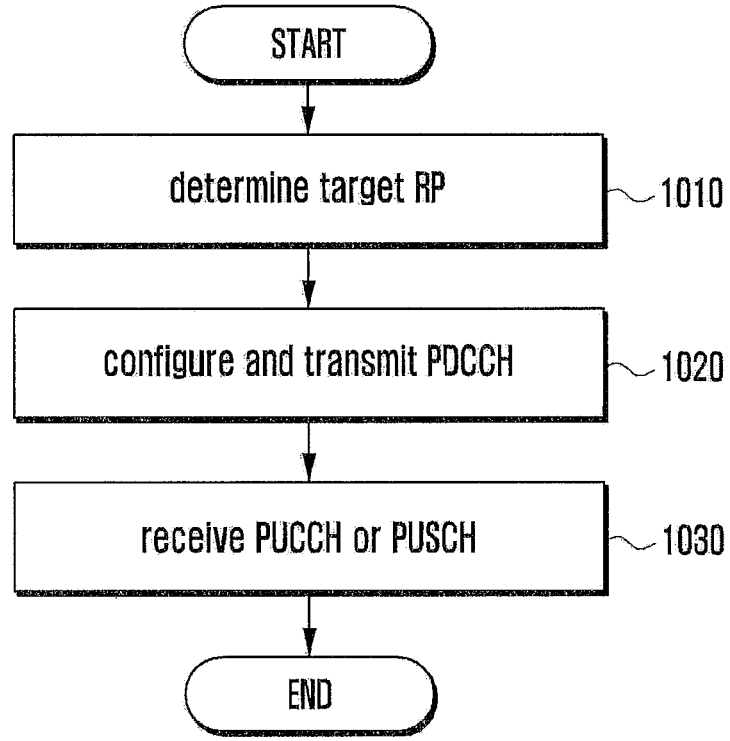
FIG. 10 is a flowchart illustrating an uplink channel reception process of a central controller (or base station) according to the second embodiment of the present invention.

FIG. 10 is a flowchart illustrating an uplink channel reception process of a central controller (or base station) according to the second embodiment of the present invention. The process of FIG. 10 corresponds to a PUCCH transmission procedure of a terminal of FIG. 8 or a PUSCH transmission procedure of FIG. 9.

In operation 1010, a central controller (or base station) determines a target RP with respect to a predetermined terminal. The central controller (or base station) measures an uplink channel status between the corresponding terminal and various points in the CoMP system, so as to determine a point having a good channel status to be a target RP. The uplink channel status may be determined based on CSI information or a Sounding Reference Signal (SRS) transmitted by the terminal.

In operation 1020, the central controller (or base station) transmits, to the predetermined terminal of operation 1010, a PDCCH including downlink scheduling information and a PDSCH, or a PDCCH including uplink scheduling information. The central controller (or base station) may transmit, to the terminal, downlink scheduling information or uplink scheduling information through an Enhanced Physical Downlink Control Channel (E-PDCCH), which is an enhanced downlink control channel, instead of the PDCCH. The central controller (or base station) may transmit the downlink scheduling information or the uplink scheduling information through the new DCI format including a target RP indicator or a CSI-RS indicator, or through an existing DCI format. The new DCI format includes a target RP indicator or a CSI-RS indicator for CoMP operation. Conversely, the existing DCI format does not include a target RP indicator or a CSI-RS indicator for CoMP operation. When the target RP of the PUCCH determined in operation 1010 is identical to the target RP of the latest PUCCH transmitted from the terminal or when the target PR of the PUSCH determined in operation 1010 is identical to the target reception point of the latest PUSCH transmitted from the terminal, the central controller (or base station) transmits downlink scheduling information or uplink scheduling information through the existing DCI format. Accordingly, the central controller (or base station) does not need to signal the target RP indicator or the CSI-RS indicator and thus, a signaling overhead may be reduced.

In operation 1030, the central controller (or base station) receives a PUCCH or a PUSCH from the predetermined terminal. The PUCCH may include HARQ ACK/NACK information of the terminal, with respect to the PDSCH transmitted from the central controller (or base station).

Third Embodiment

According to a third embodiment of the present invention, when a mobile communication system formed of a plurality of points operates a CoMP, which is a multiple-cell cooperative communication technology, a central controller (or base station) directly/indirectly indicates a target RP to a terminal, and the terminal transmits a PUCCH or a PUSCH by adjusting the transmission power based on the information. According to the third embodiment, unlike the second embodiment, a target RP associated with a PUCCH and a target RP associated with a PUSCH are commonly operated.

Figure 11:
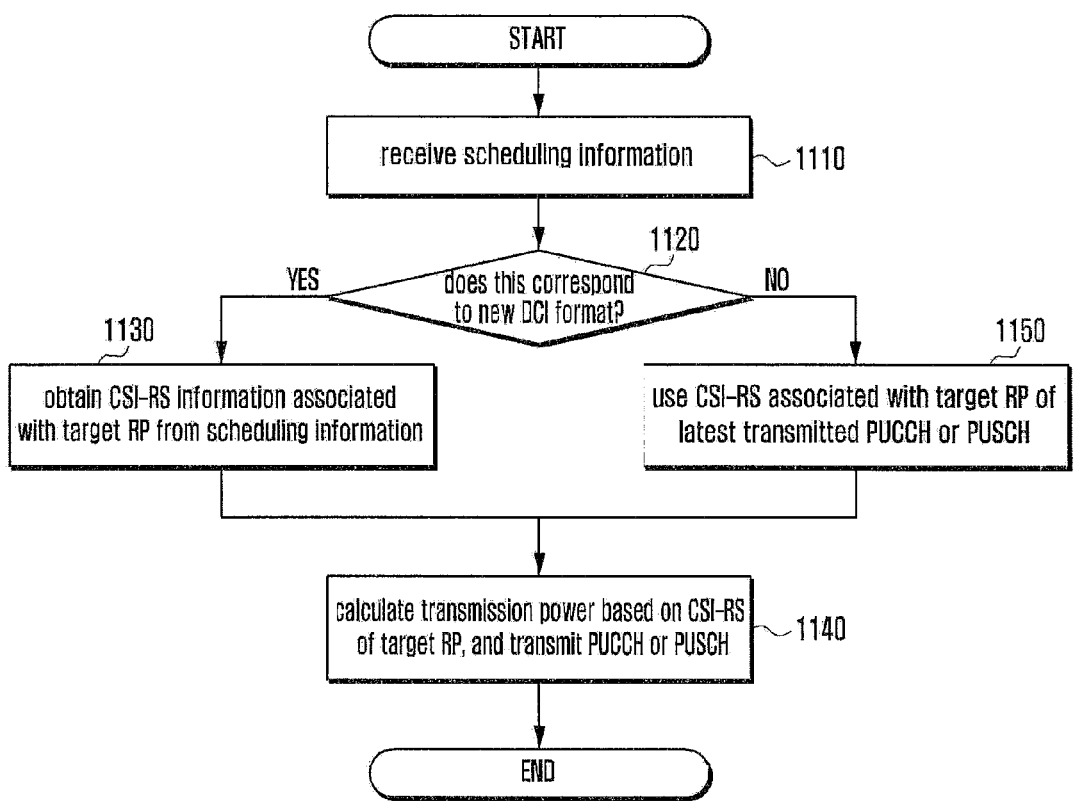
FIG. 11 is a flowchart illustrating an uplink channel transmission process of a terminal according to a third embodiment of the present invention.

FIG. 11 is a flowchart illustrating an uplink channel transmission process of a terminal according to the third embodiment of the present invention.

In operation 1110, the terminal receives a PDCCH from a central controller (or base station). The PDCCH includes downlink scheduling information associated with a PDSCH or uplink scheduling information associated with a PUSCH to be transmitted by a terminal. The terminal may receive the downlink scheduling information or uplink scheduling information through an E-PDCCH which is an enhanced downlink control channel, instead of the PDCCH.

In operation 1120, the terminal determines whether the received downlink scheduling information or uplink scheduling information corresponds to a new DCI format including a target RP indicator or a CSI-RS indicator, or a DCI format defined in the existing LTE and LTE-A systems. The new DCI format includes a target RP indicator or a CSI-RS indicator for CoMP operation. Conversely, the existing DCI format does not include a target RP indicator or a CSI-RS indicator for CoMP operation. In the LTE and LTE-A systems, the existing DCI format for downlink scheduling may include DCI format 1, DCI format1A, DCI format 1B, DCI format 1C, DCI format 1D, DCI format 2, DCI format 2A, DCI format 2B, DCI format 2C, and the like, and the existing DCI format for uplink scheduling may include DCI format 0, DCI format 4, and the like. The new DCI format for downlink scheduling or uplink scheduling may additionally include a target reception point indicator or a CSI-RS indicator in the existing DCI format of each system. Alternatively, the new DCI format for downlink scheduling or uplink scheduling may be a format that replaces a few fields of the existing DCI format with a field for a target RP indicator or a CSI-RS indicator.

When the determination of operation 1120 shows that the received downlink scheduling information or uplink scheduling information is the new DCI format including a target RP indicator or a CSI-RS indicator, the terminal obtains CSI-RS information associated with a target RP from downlink scheduling information or uplink scheduling information of the new DCI format in operation 1130. The CSI-RS information associated with the target RP may be obtained from the target RP indicator included in the new DCI format or from the CSI-RS indicator included in the new DCI format.

In operation 1140, the terminal sets a PUCCH transmission power appropriate for the target RP based on the CSI-RS information associated with the target RP obtained in operation 1130 and transmits a PUCCH, or sets a PUSCH transmission power and transmits a PUSCH. The terminal measures a channel quality of a radio link between a point from which a CSI-RS is transmitted and the terminal, from the CSI-RS information associated with the target RP, and calculates transmission power information for transmitting the PUCCH or the PUSCH. The channel quality of the radio link may be expressed through a pathloss. The pathloss is one of the indices indicating a good or bad state of a channel environment, and as the value becomes higher, the pathloss indicates that the channel environment becomes worse. When the pathloss is high, the terminal sets a transmission power of a transmission signal to be relatively high, so as to overcome the bad channel environment.

When the determination of operation 1120 shows that the received downlink scheduling information or uplink scheduling information does not correspond to the new DCI format including a target RP indicator or a CSI-RS indicator, the terminal assumes a CSI-RS associated with a target RP of the latest transmitted uplink channel from among the PUCCH and the PUSCH, to be a CSI-RS to be used for calculating s transmission power of a PUCCH or a PUSCH to be currently transmitted in operation 1150. This is possible since the target RP associated with the PUCCH and the target RP of the PUSCH are commonly operated.

For example, although an uplink channel that the terminal currently desires to transmit is a PUCCH and the latest uplink channel transmitted by the terminal is a PUSCH, a CSI-RS associated with the target RP of the PUSCH is assumed to be a CSI-RS to be used for calculating a transmission power of the PUCCH that is to be currently transmitted. Alternatively, although an uplink channel that the terminal currently desires to transmit is a PUSCH and the latest uplink channel transmitted by the terminal is a PUCCH, a CSI-RS associated with the target RP of the PUCCH is assumed to be a CSI-RS to be used for calculating a transmission power of the PUSCH that is to be currently transmitted.

In operation 1140, when the scheduling information received in operation 1110 is downlink scheduling information, the terminal sets a PUCCH transmission power appropriate for the target RP based on the CSI-RS assumed in operation 1150, and transmits the PUCCH. When the scheduling information received in operation 1110 is uplink scheduling information, the terminal sets a PUSCH transmission power appropriate for the target RP based on the CSI-RS assumed in operation 1150, and transmits the PUSCH.

According to a modification of operation 1150, when the determination of operation 1120 shows that the received downlink scheduling information or uplink scheduling information does not correspond to the new DCI format including a target RP indicator or a CSI-RS indicator, the terminal may assume a CSI-RS associated with a point that is defined in advance and reported by the central controller (or base station) through a signaling, to be a CSI-RS to be used for calculating a transmission power of a PUCCH or a PUSCH to be currently transmitted.

When the terminal receives an existing DCI format, the terminal may set $N_{PUCCH, k}^{(1)}$ of the latest transmitted PUCCH to be $N_{PUCCH, k}^{(1)}$ of a PUCCH to be currently transmitted, in connection with the first embodiment, in operation 1150.

Figure 12:
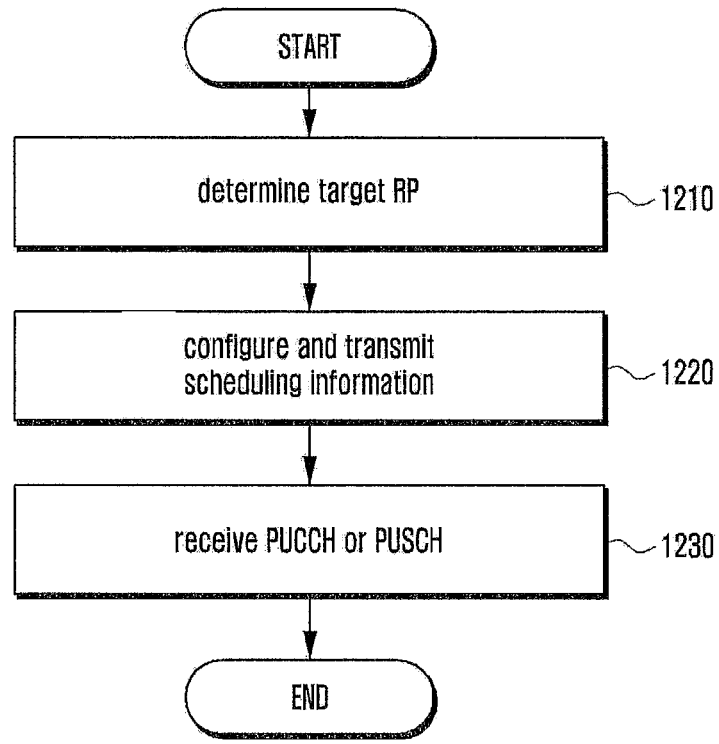
FIG. 12 is a flowchart illustrating an uplink channel reception process of a base station according to the third embodiment of the present invention.

FIG. 12 is a flowchart illustrating an uplink channel reception process of a base station according to the third embodiment of the present invention. The process of FIG. 12 corresponds to a PUCCH or PUSCH transmission procedure of a terminal of FIG. 11.

In operation 1210, the central controller (or base station) determines a target RP with respect to a predetermined terminal. The central controller (or base station) measures an uplink channel status between the corresponding terminal and various points in the CoMP system, so as to determine a point having a good channel status to be a target RP. The uplink channel status may be determined based on CSI information or a Sounding Reference Signal (SRS) transmitted by the terminal.

In operation 1220, the central controller (or base station) transmits, to the corresponding terminal of operation 1210, a PDCCH including downlink scheduling information and a PDSCH, or a PDCCH including uplink scheduling information. The central controller (or base station) may transmit, to the terminal, downlink scheduling information or uplink scheduling information through an Enhanced Physical Downlink Control Channel (E-PDCCH), which is an enhanced downlink control channel, instead of the PDCCH. The central controller (or base station) may transmit the downlink scheduling information or the uplink scheduling information through the new DCI format including a target RP indicator or a CSI-RS indicator, or through an existing DCI format. The new DCI format includes a target RP indicator or a CSI-RS indicator for CoMP operation. Conversely, the existing DCI format does not include a target RP indicator or a CSI-RS indicator for CoMP operation. When the target RP of the PUCCH or PUSCH determined in operation 1210 is identical to the target RP of the latest PUCCH or PUSCH transmitted by the terminal, the central controller (or base station) may transmit downlink scheduling information or uplink scheduling information through the existing DCI format. Accordingly, the central controller (or base station) does not need to signal the target RP indicator or the CSI-RS indicator and thus, a signaling overhead may be reduced.

In operation 1230, the central controller (or base station) receives a PUCCH or a PUSCH from the predetermined terminal. The PUCCH may include HARQ ACK/NACK information of the terminal, with respect to the PDSCH transmitted from the central controller (or base station), in operation 1220.

Figure 13:
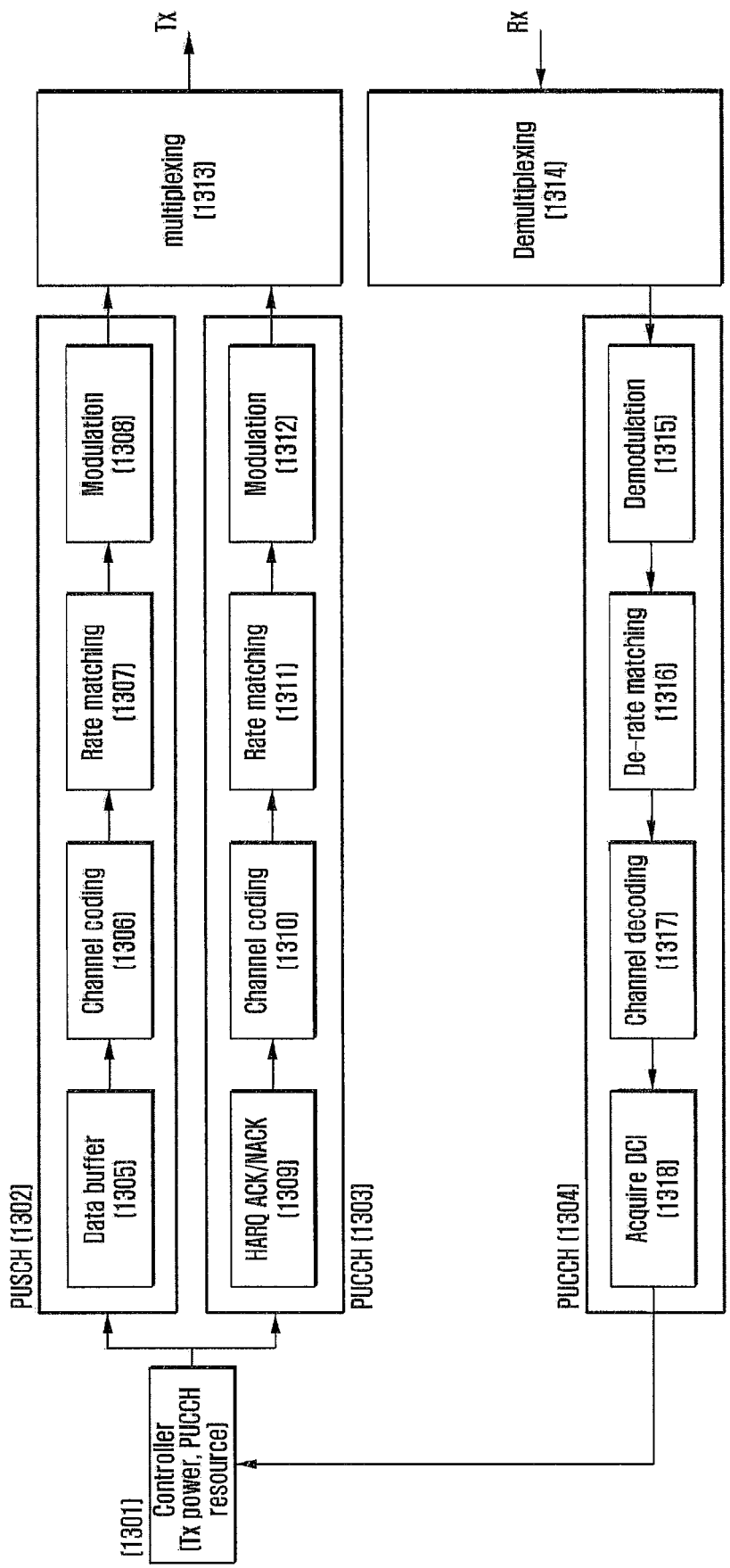
FIG. 13 is a block diagram of a terminal device according to an embodiment of the present invention.

FIG. 13 is a block diagram illustrating a configuration of a terminal device according to an embodiment of the present invention. The terminal device includes a PUSCH block 1302, a PUCCH block 1303, a PDCCH block 1304, a controller 1301, a multiplexer 1313, and a de-multiplexer 1314. Other blocks that are not directly associated with the descriptions of the present invention will be omitted.

The PUSCH block 1302 may include a data buffer 1305, a channel coding unit 1306, a rate matcher 1307, and a modulator 1308.

The PUCCH block 1303 may include a HARQ ACK/NACK generator 1309, a channel coding unit 1310, a rate matcher 1311, and a modulator 1312.

The PDCCH block 1304 may include a demodulator 1315, de-rate matcher 1316, a channel decoding unit 1317, and a DCI obtaining unit 1318.

The de-multiplexer 1314 separates a PDCCH signal from a signal received from the central controller (or base station), and transfers the same to the demodulator 1315. The demodulator 1315 demodulates the separated PDCCH signal, and transfers the same to the de-rate matcher 1316. The de-rate matcher 1316 reconfigures the demodulated PDCCH signal to include symbols before rate matching, and transfers the same to the channel decoding unit 1317. The channel decoding unit 1317 executes channel-decoding on the de-rate matched PDCCH signal, and transfers the same to the DCI obtaining unit 1318. The DCI obtaining unit 1318 obtains DCI from the channel-decoded PDCCH, and transfers the same to the controller 1301. The controller 1301 determines a resource for PUCCH transmission based on the DCI that the terminal obtains, according to the method of the first embodiment, calculates a PUCCH or PUSCH transmission power according to the method of the second or third embodiments, and controls the PUSCH block 1302 and the PUCCH block 1303. The first embodiment, the second embodiment, and the third embodiment may not need to be applied simultaneously, and the present invention includes the case in which only the first embodiment is applied, the case in which only the second embodiment is applied, and the case in which only the third embodiment is applied.

The operations of the PUSCH block 1302 will be described. The channel coding unit 1306 extracts data to be transmitted, from the data buffer 1305, executes channel-encoding on the extracted data so as to add error correcting ability, and transfers the same to the rate matcher 1307. The rate matcher 1307 executes rate matching on the channel-encoded data based on an amount of resource that is actually to be mapped, and transfers the same to the modulator 1308. The modulator 1308 modulates the rate-matched data, and transfers the same to the multiplexer 1313. The multiplexer 1313 executes multiplexing on the modulated data together with other signals, and transfers the same to the transmitting unit. A transmission power of a PUSCH that the terminal desires to transmit is controlled by the controller 1301. The signals multiplexed by the multiplexer 1313 may be converted into a Single Carrier Frequency Division Multiple Access (SC-FDMA) signal, and may be transmitted.

The PUCCH block 1303 will be described. When the terminal desires to transmit a HARQ ACK/NACK corresponding to a PDSCH, through a PUCCH, the HARQ ACK/NACK generator 1309 generates a HARQ ACK/NACK and transfers the same to the channel coding unit 1310. The channel coding unit 1310 executes channel-encoding on the received HARQ ACK/NACK so as to add error correcting ability, and transfers the same to the rate matcher 1311. The rate matcher 1311 executes rate matching on the channel-encoded HARQ ACK/NACK based on an amount of resource that is actually to be mapped, and transfers the same to the modulator 1312. The modulator 1312 modulates the rate-matched HARQ ACK/NACK, and transfers the same to the multiplexer 1313. The multiplexer 1313 executes multiplexing on the modulated HARQ ACK/NACK together with other signals, and transfers the same to the transmitting unit. A transmission power and a transmission resource of a PUCCH that the terminal desires to transmit are controlled by the controller 1301. The signals multiplexed by the multiplexer 1313 may be converted into an SC-FDMA signal, and may be transmitted.

Figure 14:
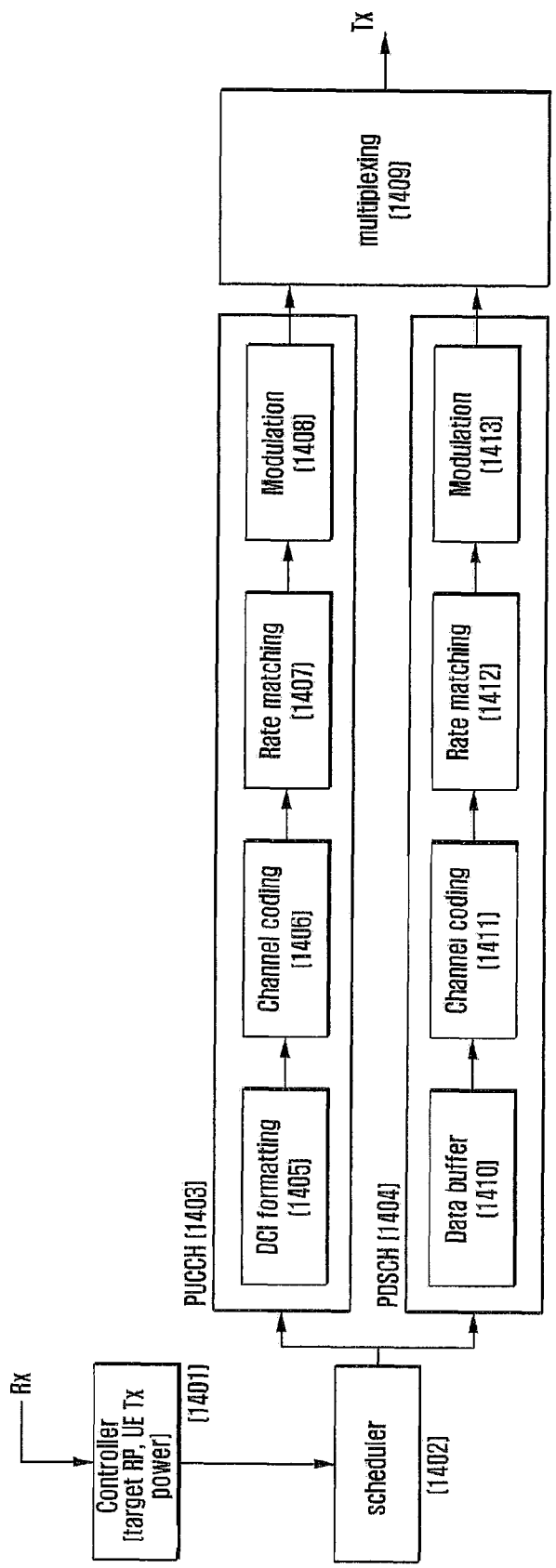
FIG. 14 is a block diagram of a central controller (or base station) device according to an embodiment of the present invention.

FIG. 14 is a block diagram of a central controller (or base station) device according to an embodiment of the present invention. The central controller (or base station) device includes a PDCCH block 1403, a PDSCH block 1404, a scheduler 1402, and a controller 1401. Other blocks that are not directly associated with the descriptions of the present invention will be omitted.

The controller 1401 measures an uplink channel status based on information from the terminal, determines a target RP associated with the corresponding terminal and a PUCCH or PUSCH transmission power, and provides the same to the scheduler 1402. The controller 1401 measures the uplink channel status of the terminal based on CSI information, an SRS, or the like received from the terminal.

The PDCCH block 1403 may include a DCI generator 1405, a channel coding unit 1406, a rate matcher 1407, and a modulator 1408.

The PDCCH block 1403 operates based on a control of the scheduler 1402.

The DCI generator 1405 generates DCI and transmits the DCI to the channel coding unit 1406. The DCI may include a target RP indicator or a CSI-RS indicator, according to the method described in the first, second, or third embodiment. The channel coding unit 1406 executes channel-coding on the generated DCI so as to add an error correcting ability, and transfers the same to the rate matcher 1407. The rate matcher 1407 executes rate matching on the channel-coded DCI based on an amount of resource that is actually to be mapped, and transfers the same to the modulator 1408. The modulator 1408 modulates the rate-matched DCI, generates a PDCCH, and transfers the same to the multiplexer 1409. The multiplexer 1409 may multiplex the PDCCH with other signals. The signals multiplexed in the multiplexer 1409 are converted into an OFDM signal, and is transferred to the terminal.

The PDSCH block 1404 operates based on a control of the scheduler 1402.

The channel coding unit 1411 extracts, from the data buffer 1410, data to be transmitted, executes channel-encoding on the extracted data so as to add an error correcting ability, and transfers the same to the rate matcher 1412. The rate matcher 1412 executes rate matching on the channel-encoded data based on an amount of resource that is actually to be mapped, and transfers the same to the modulator 1413. The modulator 1413 modulates the rate-matched data, and transfers the same to the multiplexer 1409. The multiplexer 1409 may multiplex the modulated data with other signals. The signals multiplexed in the multiplexer 1409 are converted into an OFDM signal, and is transferred to the terminal.

Exemplary embodiments of the present invention shown and described in this specification and the drawings correspond to specific examples presented in order to easily describe technical contents of the present invention and to help comprehension of the present invention, and are not intended to limit the scope of the present invention. It is obvious to those skilled in the art to which the present invention pertains that other modified embodiments on the basis of the spirit of the present invention besides the embodiments disclosed herein can be carried out.

The invention claimed is:

1. A method by a terminal to transmit an uplink channel, the method comprising:
receiving a physical downlink control channel (PDCCH) including information associated with a starting point of a dynamic physical uplink control channel (PUCCH) resource area, from a base station;
identifying the starting point of the dynamic PUCCH resource area, from the PDCCH; and
transmitting an uplink channel based on the identified starting point of the dynamic PUCCH resource area,
wherein the dynamic PUCCH resource area is identifiable by the base station as a function of a determined target reception point (RP) of the terminal.

2. The method as claimed in claim 1, further comprising:
extracting downlink scheduling information from the PDCCH;
determining whether the extracted downlink scheduling information includes downlink control information (DCI) of a DCI format that includes information from which the target RP is extracted;
obtaining channel status information reference signal (CSI-RS) information from the downlink scheduling information when the downlink scheduling information includes the DCI of the DCI format which includes the information from which the target RP is extracted;
measuring a channel quality based on the obtained CSI-RS information; and
setting a transmission power of a PUCCH based on the measured channel quality, and transmitting the PUCCH.

3. The method as claimed in claim 2, wherein the channel quality is measured through a pathloss.

4. The method as claimed in claim 2, wherein the transmission power of the PUCCH is increased as the measured channel quality decreases.

5. The method as claimed in claim 1, further comprising:
extracting uplink scheduling information from the PDCCH;
determining whether the extracted uplink scheduling information includes DCI of a DCI format that includes information from which the target RP is extracted;
obtaining CSI-RS information from the uplink scheduling information when the uplink scheduling information includes the DCI of the DCI format which includes the information from which the target RP is extracted;
measuring a channel quality based on the obtained CSI-RS information; and
setting a transmission power of a PUSCH based on the measured channel quality, and transmitting the PUSCH.

6. The method as claimed in claim 1, further comprising:
extracting scheduling information including uplink scheduling information or downlink scheduling information, from the PDCCH;
determining whether the extracted scheduling information includes DCI of a DCI format that includes information from which the target RP is extracted;
obtaining CSI-RS information from the scheduling information when the scheduling information includes the DCI of the DCI format that includes the information from which the target RP is extracted;
measuring a channel quality based on the obtained CSI-RS information; and
setting a transmission power of an uplink channel based on the measured channel quality, and transmitting the uplink channel.

7. A terminal for transmitting an uplink channel, the terminal comprising:
a receiver configured to receive a physical downlink control channel (PDCCH) from a base station;
a transmitter configured to transmit an uplink channel; and
a controller configured to:
control the receiver receive the PDCCH including infoiniation associated with a starting point of a dynamic physical uplink control channel (PUCCH) resource area;
identify the starting point of the dynamic PUCCH resource area from the PDCCH; and
control the transmitter to transmit the uplink channel based on the identified starting point of the dynamic PUCCH resource area;
wherein the dynamic PUCCH resource area is identifiable by the base station as a function of a determined target reception point (RP) of the terminal.

8. The terminal as claimed in claim 7, wherein the controller is configured to:
extract downlink scheduling information from the PDCCH,
obtain channel status information reference signal (CSI-RS) information from the downlink scheduling information when the downlink scheduling information includes downlink control information (DCI) of a DCI format that includes information from which the target RP is extracted, and
measure a channel quality based on the obtained CSI-RS information; and
the transmitter is configured to:
set a transmission power of a PUCCH based on the measured channel quality, and
transmit the PUCCH.

9. The terminal as claimed in claim 8, wherein the channel quality is measured through a pathloss.

10. The terminal as claimed in claim 7, wherein the controller is configured to:
extract uplink scheduling information from the PDCCH,
obtain CSI-RS information from the uplink scheduling information when the uplink scheduling information includes DCI of a DCI format that includes information from which the target RP is extracted, and
measure a channel quality based on the obtained CSI-RS information; and
the transmitter is configured to:
set a transmission power of a physical uplink shared channel (PUSCH) as a function of the measured channel quality, and
transmit the PUSCH.

11. The terminal as claimed in claim 7, wherein the controller is configured to:
extract scheduling information including uplink scheduling information or downlink scheduling information from the PDCCH,
obtain CSI-RS information from the scheduling information when the scheduling information includes DCI of a DCI format which includes information from which the target RP is extracted, and
measure a channel quality based on the obtained CSI-RS information; and
the transmitter configured to:
set a transmission power of an uplink channel based on the measured channel quality, and
transmit the uplink channel.

12. A method by a base station to receive an uplink channel, the method comprising:

determining a target reception point (RP) of a terminal;
identifying a dynamic physical uplink control channel (PUCCH) resource area as a function of the determined target RP;
transmitting a physical downlink control channel (PDCCH) including information associated with a starting point of the dynamic PUCCH resource area; and
receiving an uplink channel as a function of the identified dynamic PUCCH resource area.

13. The method as claimed in claim 12, further comprising:
generating channel status information reference signal (CSI-RS) information based on the determined target RP;
generating downlink scheduling information including downlink control Information (DCI) of a DCI format which includes information from which the target RP is extracted;
transmitting the downlink scheduling information; and
receiving a physical uplink control channel (PUCCH) based on the determined target RP.

14. The method as claimed in claim 13, wherein the channel quality is measured through a pathloss.

15. The method as claimed in claim 12, further comprising:
generating CSI-RS information based on the determined target RP;
generating uplink scheduling information including DCI of a DCI format which includes information from which the target RP is extracted;
transmitting the uplink scheduling information; and
receiving a physical uplink shared channel (PUSCH) based on the determined target RP.

16. The method as claimed in claim 12, further comprising:
generating CSI-RS information based on the determined target RP;
generating scheduling information including downlink scheduling information or uplink scheduling information, which includes DCI of a DCI format that includes information from which the target RP is extracted;
transmitting the scheduling information; and
receiving an uplink channel based on the determined target RP.

17. An uplink channel receiving apparatus, the apparatus comprising:
a transmitter configured to transmit a physical downlink control channel (PDCCH);
a receiver configured to receive an uplink channel;
a controller configured to:
 determine a target reception point (RP) of a terminal,
 identify a dynamic physical uplink control channel (PUCCH) resource area of the terminal as a function of the determined target RP;
 control the transmitter to transmit the PDCCH including information associated with a starting point of the dynamic PUCCH resource area; and
 control the receiver to receive the uplink channel as a function of the identified PUCCH resource area.

18. The apparatus as claimed in claim 17, wherein the controller is configured to:
generate channel status information reference signal (CSI-RS) information based on the determined target RP, and
generate downlink scheduling information including Downlink Control Information (DCI) of a DCI format which includes information from which the target RP is extracted;
the transmitter configured to transmit the downlink scheduling information; and
the receiver configured to receive a Physical Uplink Control Channel (PUCCH) based on the determined target RP.

19. The apparatus as claimed in claim 18, wherein the channel quality is measured through a pathloss.

20. The apparatus as claimed in claim 17, wherein the controller is configured to:
generate CSI-RS information based on the determined target RP, and
generate uplink scheduling information including DCI of a DCI format which includes information from which the target RP is extracted;
the transmitter is configured to transmit the uplink scheduling information; and
the receiver is configured to receive a physical uplink shared channel (PUSCH) based on the determined target RP.

* * * * *